US012761043B2

(12) United States Patent
Olkhovnikov et al.

(10) Patent No.: US 12,761,043 B2
(45) Date of Patent: Oct. 13, 2026

(54) METHOD AND ELECTRONIC DEVICE FOR CONTROLLING OPERATION OF A SELF DRIVING CAR

(71) Applicant: Direct Cursus Technology L.L.C, Dubai (AE)

(72) Inventors: Sergey Yurevich Olkhovnikov, Moscow (RU); Aleksey Dmitrievich Lubenets, Moscow (RU); Georgy Aleksandrovich Meshkov, Moscow (RU); Dmitry Andreevich Kovalenko, Butovo (RU); Mikhail Vladimirovich Korobkin, Lipetsk (RU); Kirill Stanislavovich Luchikhin, Lipetsk (RU); Dmitry Aleksandrovich Ivanov, Moscow (RU)

(73) Assignee: Y.E. HUB ARMENIA LLC, Yerevan (AM)

( * ) Notice: Subject to any disclaimer, the term of this patent is extended or adjusted under 35 U.S.C. 154(b) by 202 days.

(21) Appl. No.: 18/431,610

(22) Filed: Feb. 2, 2024

(65) Prior Publication Data

US 2024/0175709 A1 May 30, 2024

Related U.S. Application Data

(63) Continuation of application No. 18/087,013, filed on Dec. 22, 2022, now Pat. No. 12,392,638.

(30) Foreign Application Priority Data

Dec. 28, 2021 (RU) ........................... RU2021139428

(51) Int. Cl.

| | |
|---|---|
| ***G01C 21/00*** | (2006.01) |
| ***G01C 21/30*** | (2006.01) |
| ***G01S 17/89*** | (2020.01) |

(52) U.S. Cl.

CPC ......... *G01C 21/3837* (2020.08); *G01C 21/30* (2013.01); *G01S 17/89* (2013.01); *G01C 21/3889* (2020.08)

(58) Field of Classification Search

CPC ................ G01C 21/3837; G01C 21/30; G01C 21/3889; G01C 21/3841; G01S 17/89

See application file for complete search history.

(56) References Cited

U.S. PATENT DOCUMENTS

| | | | |
|---|---|---|---|
| 10,254,121 | B2 | 4/2019 | Stentz et al. |
| 10,678,244 | B2 | 6/2020 | Iandola et al. |

(Continued)

FOREIGN PATENT DOCUMENTS

| | | | |
|---|---|---|---|
| RU | 2712487 | C1 | 1/2020 |
| RU | 2721677 | C1 | 5/2020 |

(Continued)

OTHER PUBLICATIONS

Russian Search Report dated Aug. 6, 2024 issued in respect of the counterpart Russian Patent Application No. RU 2024113432.

(Continued)

*Primary Examiner* — Aniss Chad
*Assistant Examiner* — Nikki Marie M Molina
(74) *Attorney, Agent, or Firm* — BCF LLP

(57) ABSTRACT

A method and electronic device for controlling operation of a Self Driving Car (SDC) are disclosed. The method includes, at a given timestamp during operation of the SDC when located at a current location: generating a candidate location of the SDC using a localization algorithm, generating a parameter using a Machine Learning Algorithm (MLA) indicative of whether the localization algorithm is likely to generate divergent candidate locations for the SDC in a candidate portion of the map representation under a variety of conditions, determining that the localization algo- (Continued)

rithm is an unreliable localization source in the candidate portion of the map representation using the parameter, determining a multi-sourced location of the SDC using data acquired from a reduced set of localization sources, the reduced set of sources excluding the localization algorithm, and controlling operation of the SDC using the multi-sourced location as the current location of the SDC.

12 Claims, 10 Drawing Sheets

(56) References Cited

U.S. PATENT DOCUMENTS

| | | | |
|---|---|---|---|
| 10,782,136 | B2 | 9/2020 | Adams et al. |
| 2018/0058860 | A1 | 3/2018 | Matsumoto et al. |
| 2018/0075643 | A1 | 3/2018 | Sequeira et al. |
| 2018/0188026 | A1 | 7/2018 | Zhang et al. |
| 2018/0188042 | A1 | 7/2018 | Chen |
| 2019/0113927 | A1 | 4/2019 | Englard et al. |
| 2019/0146509 | A1 | 5/2019 | Dean et al. |
| 2019/0204092 | A1* | 7/2019 | Wheeler ................ G05D 1/021 |
| 2019/0227545 | A1 | 7/2019 | Yoo et al. |
| 2019/0301873 | A1 | 10/2019 | Prasser et al. |
| 2019/0323844 | A1 | 10/2019 | Yendluri et al. |
| 2019/0339709 | A1 | 11/2019 | Tay et al. |
| 2020/0232801 | A1* | 7/2020 | Kim ........................ G06F 16/29 |
| 2020/0355513 | A1 | 11/2020 | Ma et al. |
| 2020/0377078 | A1 | 12/2020 | Liu et al. |
| 2020/0386555 | A1* | 12/2020 | Schroeter .............. G01S 17/931 |
| 2021/0004017 | A1 | 1/2021 | Colgate et al. |
| 2021/0004363 | A1 | 1/2021 | Bailly et al. |
| 2021/0033404 | A1 | 2/2021 | Lawlor et al. |
| 2021/0035352 | A1 | 2/2021 | Harviainen |
| 2021/0049901 | A1 | 2/2021 | Young et al. |
| 2021/0116914 | A1 | 4/2021 | Ren et al. |
| 2021/0207968 | A1 | 7/2021 | Bonanni et al. |
| 2021/0350147 | A1 | 11/2021 | Yuan et al. |
| 2021/0365712 | A1* | 11/2021 | Lu ......................... G01S 17/931 |
| 2021/0370968 | A1 | 12/2021 | Xiao et al. |
| 2023/0176216 | A1 | 6/2023 | Desai et al. |
| 2024/0255304 | A1 | 8/2024 | Matsumoto |

FOREIGN PATENT DOCUMENTS

| | | | |
|---|---|---|---|
| RU | 2744012 | C1 | 3/2021 |
| RU | 2750118 | C1 | 6/2021 |
| RU | 2750243 | C2 | 6/2021 |
| RU | 2020117983 | A | 12/2021 |
| WO | 2018125938 | A1 | 7/2018 |
| WO | 2018126083 | A1 | 7/2018 |
| WO | 2020139377 | A1 | 7/2020 |
| WO | 2021042051 | A1 | 3/2021 |

OTHER PUBLICATIONS

Russian Search Report dated Jan. 24, 2024 issued in respect of the counterpart Russian Patent Application No. RU 2021139428.

Notice of Allowance dated Jul. 18, 2025 received in respect of a related U.S. Appl. No. 18/087,013.

Kichun et al., "Simultaneous Localization and Map Change Update for the High-Definition Map-Based Autonomous Driving Car", Published on Sep. 18, 2018, Sensors, vol. 18, p. 3145, https://www.mdpi.com/1424-8220/18/9/3145.

Sathya et al., "Real Time Map Updating by Self Driving Cars using Cloud Computing"—IJESC, Published on Oct. 2019, vol. 9, Issue No. 10, pp. 23910-23913, https://ijesc.org/.

Office Action issued on Mar. 21, 2025 in respect of the related U.S. Appl. No. 18/087,013.

* cited by examiner

METHOD AND ELECTRONIC DEVICE FOR CONTROLLING OPERATION OF A SELF DRIVING CAR

CROSS-REFERENCE

The present application is a continuation of U.S. patent application Ser. No. 18/087,013, entitled "Method and a Server for Updating a Map Representation", filed Dec. 22, 2022, the entirety of which is incorporated by reference herein; which in turn claims priority to Russian Patent Application No. 2021139428, entitled "Method and a Server for Updating a Map Representation", filed Dec. 28, 2021, the entirety of which is incorporated by reference herein.

TECHNICAL FIELD

The present technology relates generally to LIDAR systems and, in particular, to methods and servers for updating a map representation.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which, upon detection of obstacles in front of the moving vehicle, slow down or stop the moving vehicle.

Some of the more advanced systems provide for a fully autonomous driving of the vehicle without direct control from the operator (i.e. the driver). These autonomously driven vehicles include systems that can cause the vehicle to accelerate, brake, stop, change lane and self-park.

One of the main technical challenges in implementing the above systems is the ability to detect objects located around the vehicle. In one example, the systems may need the ability to detect the vehicle in front of the present vehicle (the present vehicle having the system onboard), posing a risk/danger to the present vehicle and may require the system to take a corrective measure, be it braking or otherwise changing speed, stopping or changing lanes. In another example, the systems may need to detect a pedestrian or animal crossing in front of the vehicle or otherwise in a surrounding environment of the vehicle.

LIDAR-based object detection generally comprises transmitting beams of light towards a region of interest, and detecting reflected light beams, such as from objects in the region of interest, to generate a representation of the region of interest including any objects. Lasers emitting pulses of light within a narrow wavelength are often used as the radiation (light) source. The position and distance of the object can be computed using inter alia Time of Flight calculations of the emitted and detected light beam. By computing such positions as "data points", a digital multi-dimensional representation of the surroundings can be generated.

A 3D representation is formed in part by reflected beams received by the LIDAR which generates data points representative of the surrounding objects. These points form clouds that represent the surrounding environment and form a 3D map. Each point in the point cloud is associated with coordinates in a coordinate space. Additionally, each point can be associated with some additional information such as the distance to the object from the self-driving vehicle. Other information may be associated with the points in the point cloud.

The point clouds captured by the SDC may be used not only for detecting objects in the surroundings, but also for determining a current location of the SDC. The latter process is referred to as localization. One way of performing localization is based on a combination of a given point cloud captured by the LIDAR and a map. Such localization may perform poorly, especially when the map is not up to date.

US Patent publication 2019/204092 discloses a vehicle that performs localization to determine the current location of the vehicle using different localization techniques as the vehicle drives.

SUMMARY

Therefore, there is a need for systems and methods which avoid, reduce or overcome the limitations of the prior art.

Light detection and ranging (LIDAR) systems are widely used in self-driving vehicles for detecting objects and navigation. A LIDAR system collects points corresponding to light beams reflected from the objects in surroundings and uses these points for creating a cloud of points that serves as a 3D map representation of the surrounding environment.

During navigation, point clouds captured by the LIDAR system may be used in combination with a map representation of the geographical region where the SDC is operating for determining a current location of the SDC. Such map representations may thus be used by SDCs to safely navigate to their destinations without human input or with limited human input.

In some embodiments, the map representation may be a High Definition (HD) map. Broadly speaking, a HD map refers to a map representation storing data with very high precision, typically 5-10 cm. For example, HD maps may contain spatial geometric information about the roads on which an SDC can travel. Accordingly, the generated HD maps include the information necessary for an SDC navigating safely without human intervention. In other embodiments, it is contemplated that the map representation may have been built based on LIDAR data captured in the geographical region, which has been merged "together" for representing the geographical region. An HD map may have a point cloud representation, a voxel representation, and/or object-based representation.

As alluded to above, the SDC needs to localize—i.e., determine the current location of the SDC with high accuracy to be able to navigate. A number of localization techniques may be employed by the SDC for determining the current location of the SDC.

In some embodiments, a localization technique may be based on odometry that represents the process of estimating the motion of the vehicle relative to the vehicle's position based on sequential sensor data received by the vehicle. A localization algorithm may use odometry to assist in initializing position of the vehicle for use by a localization technique in performing its local search. The localization algorithm may also use odometry to estimate velocity and acceleration of the vehicle as a way to extrapolate the vehicle position in between sensor readings that may be used to localize. For example, if some localization sources fail, the SDC may fall back to odometry to estimate motion from a previously known pose based on IMU or vehicle control signals. Another localization technique is LIDAR based localization. Localization sources based on LIDAR based localization include ground/non-ground variations that perform separate processing for ground based features vs. non-ground features; LIDAR based localization that processes all points vs. high intensity points; LIDAR based localization that performs color matching; LIDAR based localization that separate separated hardscape (hard surfaces such as buildings) vs. softscape (vegetation); and so on. Another localization technique is feature-based localization that detects features using sensor data such as camera images and LIDAR scans and compares the features with features in the HD map to determine the location of the vehicle. Another localization technique uses image-based odometry to determine location of the vehicle. Variations of image-based odometry determine location of the vehicle by comparing different features extracted from camera images (for example, ground textures, image features, edges, and so on) with a map. Another localization technique uses LIDAR-based odometry to determine location of the vehicle. Variations of LIDAR-based odometry use one of pairwise iterative closest point (ICP) or multi-scan ICP. Variants of all the above techniques are obtained by changing various parameters such as iteration limits, search radius, weighting, and so on. Other localization techniques include global navigation satellite system (GNSS) based localization and inertial measurement unit (IMU) based odometry. Variants of these techniques use different integration methods and various correction methods.

The performance of a localization technique may depend on various factors, for example, a current scene surrounding the autonomous vehicle including the geometry of structures around the autonomous vehicle, identifiable photometric features, and so on. It should be noted that localization techniques using map representations may suffer from poor performance if the map representation is not up to date.

In some embodiments, the developers of the present technology have devised methods and devices for determining portion(s) of the map representation that need(s) to be updated. In other embodiments, the developers have devised methods and devices that can employ one or more metrics for determining convergence of candidate locations in a given portion of the map representation. In further embodiments, the developers have devised methods and devices that to validate outcomes from the localization algorithm during operation of the SDC, such if the localization algorithm is estimated to perform poorly (e.g., generate divergent candidate locations) in a given portion of the map representation, the outcomes of the localization algorithm will be excluded from the bulk of data originating from a variety of localization sources for operating the SDC.

In some embodiments it can be said that there is a first map representation and a second map representation. The second map representation may be built from point clouds of a first trajectory. For a second trajectory, poor localization may occur using the first map representation, and good localization may occur using the second map representation. In some embodiments, the first trajectory may be employed during a preliminary detection of stale map portions. In other embodiments, when it has been determined that there is a stale map portion, the second trajectory can be employed for confirming the need to update, and the first trajectory can be used during the actual updating process.

In a first broad aspect of the present technology, there is provided a method of updating a map representation of a geographical region. The map representation has been built based on point cloud data captured by a LIDAR system of a SDC that has operated in the geographical region. The method is executable by a server. The method comprises, for a given timestamp along a past trajectory of the SDC when the SDC has been located at a given location in the geographical region, generating, by the server using a localization algorithm, a set of candidate locations using a set of point clouds and the map representation. The set of point clouds is associated with the given location. The given location is in a candidate portion of the map representation. The method comprises, for a given timestamp along a past trajectory of the SDC when the SDC has been located at a given location in the geographical region, determining, by the server using a convergence metric, a parameter for evaluating quality of localization of the localization algorithm when the SDC is located in the candidate portion of the map representation. The parameter is indicative of convergence of candidate locations in the set of candidate locations. The method comprises, for a given timestamp along a past trajectory of the SDC when the SDC has been located at a given location in the geographical region, identifying, by the server using the parameter, the candidate portion of the map representation as an outdated portion of the map representation. The identifying is done in response to the parameter being above a pre-determined radius threshold. The method comprises updating, by the server, the outdated portion of the map representation using point cloud data captured by the LIDAR system.

In some embodiments of the method, the parameter is indicative of whether the first candidate location and the second candidate location converge within a pre-determined threshold value.

In some embodiments of the method, the first candidate location is a first candidate position of the SDC, and wherein the pre-determined threshold value is a pre-determined radius, and wherein the candidate portion of the map representation is identified as the outdated portion of the map representation if the first candidate position and the second candidate position are not within a circle of the pre-determined radius.

In some embodiments of the method, the first candidate location is further a first candidate orientation of the SDC, and wherein the pre-determined threshold value is further a pre-determined angle, and wherein the candidate portion of the map representation is identified as the outdated portion of the map representation if at least one of: the first candidate position and the second candidate position are not within the circle of the pre-determined radius, and the first candidate orientation and the second candidate orientation are not within a sector of the pre-determined angle.

In a second broad aspect of the present technology, there is provided a method of updating a map representation of a geographical region. The map representation has been built based on point cloud data captured by a LIDAR system of a SDC that has operated in the geographical region. The method is executable by a server. The method comprises identifying, by the server, a past trajectory of the SDC in the geographical region. The past trajectory is associated with a plurality of point clouds from log data of the SDC. The plurality of point clouds has been captured by the LIDAR system when the SDC was travelling along the trajectory in the geographical region. The method comprises for a given timestamp along a past trajectory of the SDC when the SDC has been located at a given location in the geographical region, determining, by the server, a first point cloud from the plurality of point clouds that has been captured by the LIDAR system at the given timestamp. The method comprises for a given timestamp along a past trajectory of the SDC when the SDC has been located at a given location in the geographical region, generating, by the server using a localization algorithm, a first candidate location using the first point cloud and the map representation, the given location being in a candidate portion of the map representation. The method comprises for a given timestamp along a past trajectory of the SDC when the SDC has been located at a given location in the geographical region, determining, by the server, a second point cloud associated with the given location. The method comprises for a given timestamp along a past trajectory of the SDC when the SDC has been located at a given location in the geographical region, generating, by the server using the localization algorithm, a second candidate location using the second point cloud and the map representation. The method comprises for a given timestamp along a past trajectory of the SDC when the SDC has been located at a given location in the geographical region, determining, by the server using a convergence metric, a parameter for evaluating quality of localization of the localization algorithm in the candidate portion of the map representation. The parameter is indicative of convergence of the first candidate location with the second candidate location. The method comprises for a given timestamp along a past trajectory of the SDC when the SDC has been located at a given location in the geographical region, identifying, by the server using the parameter, the candidate portion of the map representation as an outdated portion of the map representation. The method comprises, updating, by the server, the outdated portion of the map representation using point cloud data captured by the LIDAR system.

In some embodiments of the method, the determining the second point cloud comprises generating, by the server, a simulated point cloud using the first point cloud, the simulated point cloud being a degraded version of the first point cloud.

In some embodiments of the method, the degraded version of the first point cloud is missing a subset of points from the first point cloud.

In some embodiments of the method, the generating the simulated point cloud comprises applying, by the server, a filter representing an effect of an environmental condition on the first point cloud.

In some embodiments of the method, the environmental condition is at least one of rain, snow, and dirt occluding the LIDAR system.

In some embodiments of the method, the determining the second point cloud comprises determining, by the server, the second point cloud from log data of a second SDC that has operated in the geographical region, the second SDC having a second LIDAR system, the second point cloud having been captured by the second LIDAR system when the SDC has been located at the given location.

In some embodiments of the method, the server is configured to execute a Machine Learning Algorithm (MLA). The method further comprises generating, by the server a training set including a training input and a training label, the training input including the map representation, the first candidate location, and the first point cloud, the training label being based on the parameter. The method further comprises training, by the server, the MLA to generate a second parameter using the training set. The second parameter is indicative of whether the localization algorithm generates convergent candidate locations for the SDC in the candidate portion of the map representation.

In some embodiments of the method, candidate locations are convergent if the localization algorithm generates candidate locations that converge within a pre-determined threshold value.

In some embodiments of the method, the server is configured to execute a Machine Learning Algorithm (MLA). The method further comprises generating, by the server a training set including a training input and a training label, the training input including the map representation, the second candidate location, and the second point cloud, the training label being based on the parameter. The method further comprises training, by the server, the MLA to generate a second parameter using the training set. The second parameter is indicative of whether the localization algorithm is likely to generate convergent candidate locations for the SDC in the candidate portion of the map representation.

In some embodiments of the method, the method further comprises, for the given timestamp along the past trajectory of the SDC when the SDC has been located at the given location in the geographical region, determining, by the server using a second convergence metric, a second parameter for evaluating quality of localization of the localization algorithm in the candidate portion of the map representation. The second parameter is indicative of whether the localization algorithm is likely to generate divergent candidate locations for the SDC in the candidate portion of the map representation. The method further comprises, for the given timestamp along the past trajectory of the SDC when the SDC has been located at the given location in the geographical region, identifying, by the server, the candidate portion of the map representation as an outdated portion of the map representation using at least one of the parameter and the second parameter.

In a third aspect of the present technology, there is provided a method of controlling operation of a Self-Driving Car (SDC). The SDC is communicatively coupled to a Light Detection and Ranging (LIDAR) system and an electronic device having a processor. The processor is configured to acquire data from a plurality of localization sources for locating the SDC on a map representation of a geographical region. The method is executable by the processor. The method comprises, at a given timestamp during operation of the SDC when the SDC is located at a current location in the geographical region, generating, by the processor using a localization algorithm, a candidate location of the SDC using a point cloud captured by the LIDAR system, the map representation, and an initial approximation of the current location of the SDC on the map representation. The method comprises, at a given timestamp during operation of the SDC when the SDC is located at a current location in the geographical region, generating, by the processor using a Machine Learning Algorithm (MLA), a parameter indicative of whether the localization algorithm is likely to generate convergent candidate locations for the SDC in a candidate portion of the map representation under a variety of conditions, the candidate portion including the current location. The method comprises, at a given timestamp during operation of the SDC when the SDC is located at a current location in the geographical region, determining, by the processor using the parameter, that the localization algorithm is an unreliable localization source in the candidate portion of the map representation. The method comprises, at a given timestamp during operation of the SDC when the SDC is located at a current location in the geographical region, determining, by the server, a multi-sourced location of the SDC using data acquired from a reduced set of localization sources, the reduced set of localization sources excluding the localization algorithm. The method comprises, at a given timestamp during operation of the SDC when the SDC is located at a current location in the geographical region, controlling, by the processor, operation of the SDC using the multi-sourced location as the current location of the SDC.

In a fourth aspect of the present technology, there is provided a server for updating a map representation of a geographical region. The map representation has been built based on point cloud data captured by a Light Detection and Ranging (LIDAR) system of a Self-Driving Car (SDC) that has operated in the geographical region. The server is configured to identify a past trajectory of the SDC in the geographical region, the past trajectory being associated with a plurality of point clouds from log data of the SDC, the plurality of point clouds having been captured by the LIDAR system when the SDC was travelling along the trajectory in the geographical region. The server is configured to, for a given timestamp along a past trajectory of the SDC when the SDC has been located at a given location in the geographical region, determine a first point cloud from the plurality of point clouds that has been captured by the LIDAR system at the given timestamp. The server is configured to, for a given timestamp along a past trajectory of the SDC when the SDC has been located at a given location in the geographical region, generate, using a localization algorithm, a first candidate location using the first point cloud and the map representation, the given location being in a candidate portion of the map representation. The server is configured to, for a given timestamp along a past trajectory of the SDC when the SDC has been located at a given location in the geographical region, determine a second point cloud associated with the given location. The server is configured to, for a given timestamp along a past trajectory of the SDC when the SDC has been located at a given location in the geographical region, generate, using the localization algorithm, a second candidate location using the second point cloud and the map representation. The server is configured to, for a given timestamp along a past trajectory of the SDC when the SDC has been located at a given location in the geographical region, determine, using a convergence metric, a parameter for evaluating quality of localization of the localization algorithm in the candidate portion of the map representation, the parameter being indicative of convergence of the first candidate location with the second candidate location. The server is configured to, for a given timestamp along a past trajectory of the SDC when the SDC has been located at a given location in the geographical region, identify, using the parameter, the candidate portion of the map representation as an outdated portion of the map representation. The server is configured to update the outdated portion of the map representation using point cloud data captured by the LIDAR system.

In some embodiments of the server, to determine the second point cloud comprises the server configured to generate a simulated point cloud using the first point cloud, the simulated point cloud being a degraded version of the first point cloud.

In some embodiments of the server, the degraded version of the first point cloud is missing a subset of points from the first point cloud.

In some embodiments of the server, to generate the simulated point cloud comprises the server configured to apply a filter representing an effect of an environmental condition on the first point cloud.

In some embodiments of the server, the environmental condition is at least one of rain, snow, and dirt occluding the LIDAR system.

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light source could include a laser such as a solid-state laser, laser diode, a high power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser source may emit light beams in differing formats, such as light pulses, continuous wave (CW), quasi-CW, and so on. In some non-limiting examples, the laser source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm, or in between any other suitable range. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" or "environment" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LIDAR system in which the one or more objects may be detected. It is noted that the region of interest of the LIDAR system may be affected by various conditions such as but not limited to: an orientation of the LIDAR system (e.g. direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The ROI of LIDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
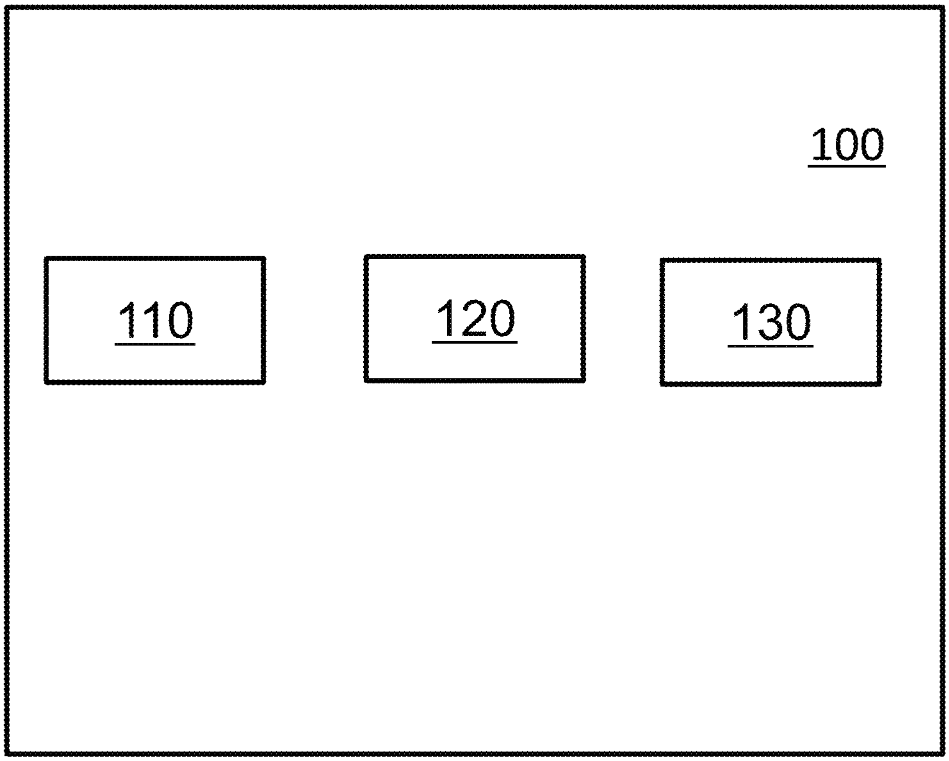
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
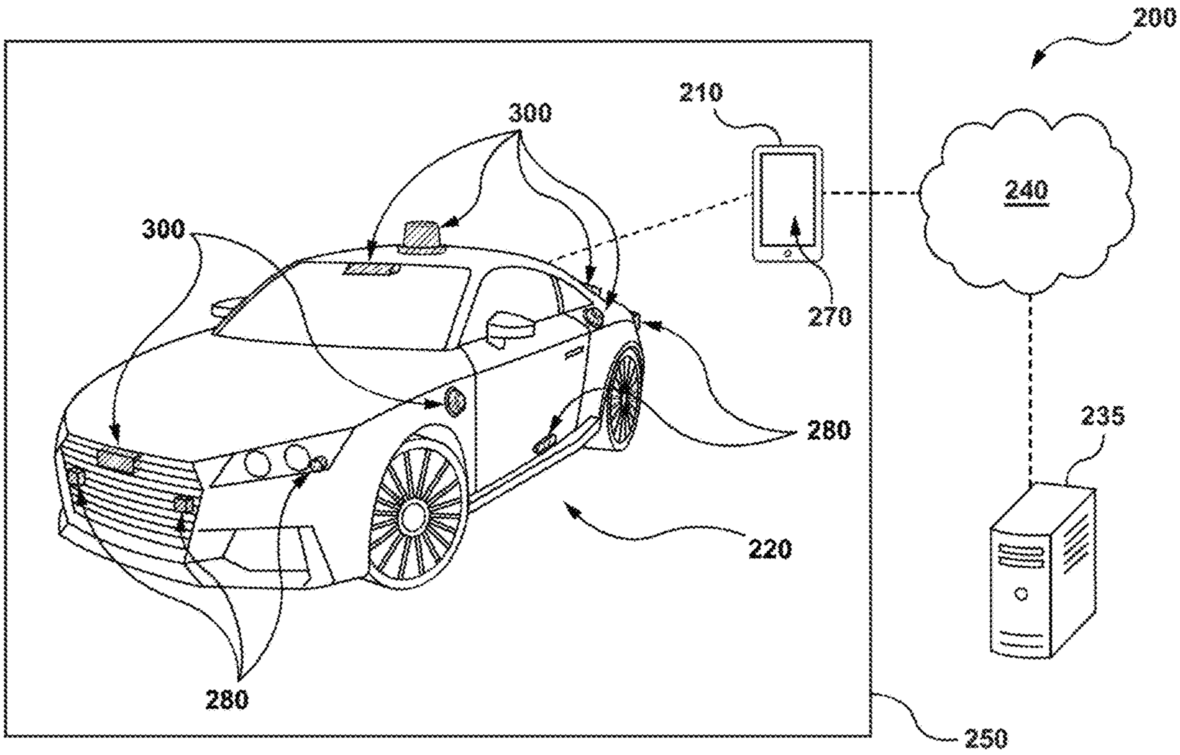
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The networked computing environment 200 also includes a server 235 in communication with the electronic device 210 via a communication network 240 (e.g. the Internet or the like, as will be described in greater detail herein below).

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

It should be noted that the plurality of sensor systems 280 could include additional types of sensor systems to those non-exhaustively described above and without departing from the scope of the present technology.

LIDAR System

According to the non-limiting embodiments of the present technology and as is illustrated in FIG. 2, the vehicle 220 is equipped with at least one Light Detection and Ranging (LIDAR) system, such as a LIDAR system 300, for gathering information about surroundings 250 of the vehicle 220. While only described herein in the context of being attached to the vehicle 220, it is also contemplated that the LIDAR system 300 could be a stand-alone operation or connected to another system.

Depending on the embodiment, the vehicle 220 could include more or fewer LIDAR systems 300 than illustrated. Depending on the particular embodiment, choice of inclusion of particular ones of the plurality of sensor systems 280 could depend on the particular embodiment of the LIDAR system 300. The LIDAR system 300 could be mounted, or retrofitted, to the vehicle 220 in a variety of locations and/or in a variety of configurations.

For example, depending on the implementation of the vehicle 220 and the LIDAR system 300, the LIDAR system 300 could be mounted on an interior, upper portion of a windshield of the vehicle 220. Nevertheless, as illustrated in FIG. 2, other locations for mounting the LIDAR system 300 are within the scope of the present disclosure, including on a back window, side windows, front hood, rooftop, front grill, front bumper or the side of the vehicle 220. In some cases, the LIDAR system 300 can even be mounted in a dedicated enclosure mounted on the top of the vehicle 220.

In some non-limiting embodiments, such as that of FIG. 2, a given one of the plurality of LIDAR systems 300 is mounted to the rooftop of the vehicle 220 in a rotatable configuration. For example, the LIDAR system 300 mounted to the vehicle 220 in a rotatable configuration could include at least some components that are rotatable 360 degrees about an axis of rotation of the given LIDAR system 300. When mounted in rotatable configurations, the given LIDAR system 300 could gather data about most of the portions of the surroundings 250 of the vehicle 220.

In some non-limiting embodiments of the present technology, such as that of FIG. 2, the LIDAR systems 300 is mounted to the side, or the front grill, for example, in a non-rotatable configuration. For example, the LIDAR system 300 mounted to the vehicle 220 in a non-rotatable configuration could include at least some components that are not rotatable 360 degrees and are configured to gather data about pre-determined portions of the surroundings 250 of the vehicle 220.

Irrespective of the specific location and/or the specific configuration of the LIDAR system 300, it is configured to capture data about the surroundings 250 of the vehicle 220 used, for example, for building a multi-dimensional map of objects in the surroundings 250 of the vehicle 220. Details relating to the configuration of the LIDAR systems 300 to capture the data about the surroundings 250 of the vehicle 220 will now be described.

It should be noted that although in the description provided herein the LIDAR system 300 is implemented as a Time of Flight LIDAR system—and as such, includes respective components suitable for such implementation thereof—other implementations of the LIDAR system 300 are also possible without departing from the scope of the present technology. For example, in certain non-limiting embodiments of the present technology, the LIDAR system 300 may also be implemented as a Frequency-Modulated Continuous Wave (FMCW) LIDAR system according to one or more implementation variants and based on respective components thereof as disclosed in a Russian Patent Application 2020117983 filed Jun. 1, 2020 and entitled "LIDAR DETECTION METHODS AND SYSTEMS"; the content of which is hereby incorporated by reference in its entirety.

Figure 3:
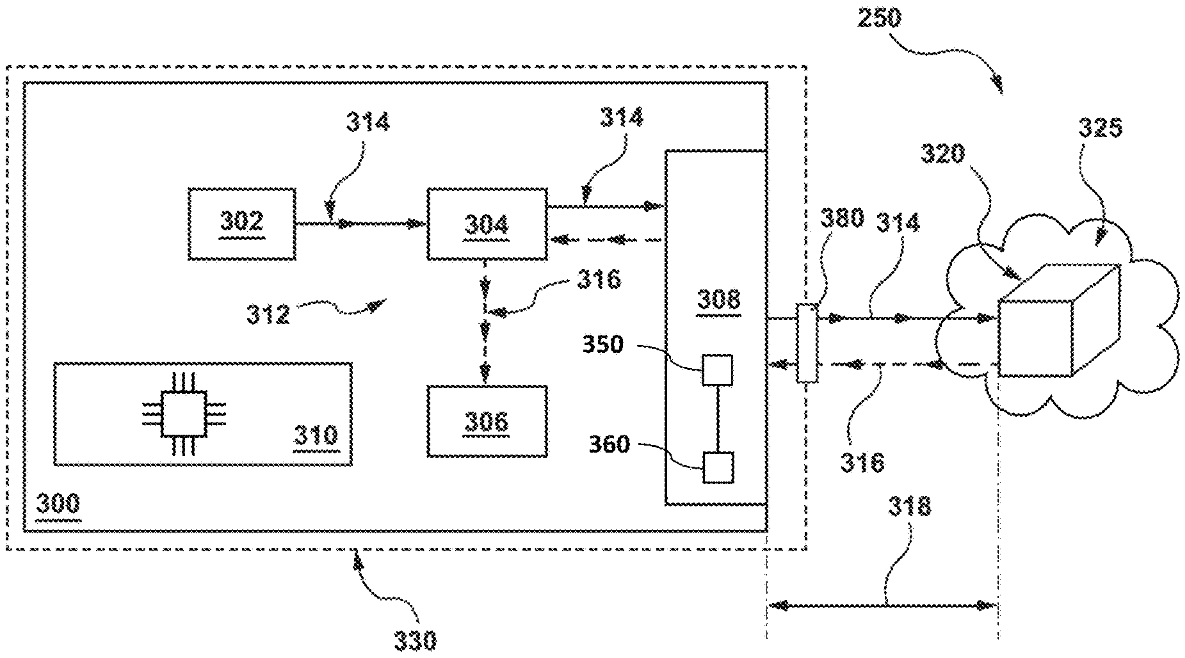
FIG. 3 depicts a schematic diagram of an example LIDAR system implemented in accordance with certain non-limiting embodiments of the present technology.

With reference to FIG. 3, there is depicted a schematic diagram of one particular embodiment of the LIDAR system 300 implemented in accordance with certain non-limiting embodiments of the present technology.

Broadly speaking, the LIDAR system 300 includes a variety of internal components including, but not limited to: (i) a light source 302 (also referred to as a "laser source" or a "radiation source"), (ii) a beam splitting element 304, (iii) a scanning unit 308 (also referred to as a "scanner", and "scanner assembly"), (iv) a detection unit 306 (also referred to herein as a "detection system", "receiving assembly", or a "detector"), and (v) a controller 310. It is contemplated that in addition to the components non-exhaustively listed above, the LIDAR system 300 could include a variety of sensors (such as, for example, a temperature sensor, a moisture sensor, etc.) which are omitted from FIG. 3 for sake of clarity.

In certain non-limiting embodiments of the present technology, one or more of the internal components of the LIDAR system 300 are disposed in a common housing 330 as depicted in FIG. 3. In some embodiments of the present technology, the controller 310 could be located outside of the common housing 330 and communicatively connected to the components therein. As it will become apparent from the description herein further below, the housing 330 has a window 380 towards the surroundings of the vehicle 220 for allowing beams of light exiting the housing 330 and entering the housing 330.

Generally speaking, the LIDAR system 300 operates as follows: the light source 302 of the LIDAR system 300 emits pulses of light, forming an output beam 314; the scanning unit 308 scans the output beam 314 through the window 380 across the surroundings 250 of the vehicle 220 for locating/capturing data of a priori unknown objects (such as an object 320) therein, for example, for generating a multi-dimensional map of the surroundings 250 where objects (including the object 320) are represented in a form of one or more data points. The light source 302 and the scanning unit 308 will be described in more detail below.

As certain non-limiting examples, the object 320 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Further, let it be assumed that the object 320 is located at a distance 318 from the LIDAR system 300. Once the output beam 314 reaches the object 320, the object 320 generally reflects at least a portion of light from the output beam 314, and some of the reflected light beams may return back towards the LIDAR system 300, to be received in the form of an input beam 316. By reflecting, it is meant that at least a portion of light beam from the output beam 314 bounces off the object 320. A portion of the light beam from the output beam 314 may be absorbed or scattered by the object 320.

Accordingly, the input beam 316 is captured and detected by the LIDAR system 300 via the detection unit 306. In response, the detection unit 306 is then configured to generate one or more representative data signals. For example, the detection unit 306 may generate an output electrical signal (not depicted) that is representative of the input beam 316. The detection unit 306 may also provide the so-generated electrical signal to the controller 310 for further processing. Finally, by measuring a time between emitting the output beam 314 and receiving the input beam 316 the distance 318 to the object 320 is calculated by the controller 310.

As will be described in more detail below, the beam splitting element 304 is utilized for directing the output beam 314 from the light source 302 to the scanning unit 308 and for directing the input beam 316 from the scanning unit to the detection unit 306.

Use and implementations of these components of the LIDAR system 300, in accordance with certain non-limiting embodiments of the present technology, will be described immediately below.

Light Source

The light source 302 is communicatively coupled to the controller 310 and is configured to emit light having a given operating wavelength. To that end, in certain non-limiting embodiments of the present technology, the light source 302 could include at least one laser pre-configured for operation at the given operating wavelength. The given operating wavelength of the light source 302 may be in the infrared, visible, and/or ultraviolet portions of the electromagnetic spectrum. For example, the light source 302 may include at least one laser with an operating wavelength between about 650 nm and 1150 nm. Alternatively, the light source 302 may include a laser diode configured to emit light at a wavelength between about 800 nm and about 1000 nm, between about 850 nm and about 950 nm, or between about 1300 nm and about 1600 nm. In certain other embodiments, the light source 302 could include a light emitting diode (LED).

The light source 302 of the LIDAR system 300 is generally an eye-safe laser, or put another way, the LIDAR system 300 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

According to certain non-limiting embodiments of the present technology, the operating wavelength of the light source 302 may lie within portions of the electromagnetic spectrum that correspond to light produced by the Sun. Therefore, in some cases, sunlight may act as background noise, which can obscure the light signal detected by the LIDAR system 300. This solar background noise can result in false-positive detections and/or may otherwise corrupt measurements of the LIDAR system 300. Although it may be feasible in some cases to increase a Signal-to-Noise Ratio (SNR) of the LIDAR system 300 by increasing the power level of the output beam 314, this may not be desirable in at least some situations. For example, it may not in some implementations be desirable to increase power levels of the output beam 314 to levels beyond eye-safe thresholds.

The light source 302 includes a pulsed laser configured to produce, emit, or radiate pulses of light with a certain pulse duration. For example, in some non-limiting embodiments of the present technology, the light source 302 may be configured to emit pulses with a pulse duration (e.g., pulse width) ranging from 10 ps to 100 ns. In other non-limiting embodiments of the present technology, the light source 302 may be configured to emit pulses at a pulse repetition frequency of approximately 100 kHz to 5 MHz or a pulse period (e.g., a time between consecutive pulses) of approximately 200 ns to 10 μs. Overall, however, the light source 302 can generate the output beam 314 with any suitable average optical power, and the output beam 314 may include optical pulses with any suitable pulse energy or peak optical power for a given application.

In some non-limiting embodiments of the present technology, the light source 302 could include one or more laser diodes, including but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source 302 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light source 302 may include one or more laser diodes that are current-modulated to produce optical pulses.

In some non-limiting embodiments of the present technology, the light source 302 is generally configured to emit the output beam 314 that is a collimated optical beam, but it is contemplated that the beam produced could have any suitable beam divergence for a given application. Broadly speaking, divergence of the output beam 314 is an angular measure of an increase in beam cross-section size (e.g., a beam radius or beam diameter) as the output beam 314 travels away from the light source 302 or the LIDAR system 300. In some non-limiting embodiments of the present technology, the output beam 314 may have a substantially circular cross-section.

It is also contemplated that the output beam 314 emitted by light source 302 could be unpolarized or randomly polarized, could have no specific or fixed polarization (e.g., the polarization may vary with time), or could have a particular polarization (e.g., the output beam 314 may be linearly polarized, elliptically polarized, or circularly polarized).

In at least some non-limiting embodiments of the present technology, the output beam 314 and the input beam 316 may be substantially coaxial. In other words, the output beam 314 and input beam 316 may at least partially overlap or share a common propagation axis, so that the input beam 316 and the output beam 314 travel along substantially the same optical path (albeit in opposite directions). Nevertheless, in other non-limiting embodiments of the present technology, the output beam 314 and the input beam 316 may not be coaxial, or in other words, may not overlap or share a common propagation axis inside the LIDAR system 300, without departing from the scope of the present technology.

It should be noted that in at least some non-limiting embodiments of the present technology, the light source 302 could be rotatable, such as by 360 degrees or less, about the axis of rotation (not depicted) of the LIDAR system 300 when the LIDAR system 300 is implemented in a rotatable configuration. However, in other embodiments, the light source 302 may be stationary even when the LIDAR system 300 is implemented in a rotatable configuration, without departing from the scope of the present technology.

Beam Splitting Element

With continued reference to FIG. 3, there is further provided the beam splitting element 304 disposed in the housing 330. For example, as previously mentioned, the beam splitting element 304 is configured to direct the output beam 314 from the light source 302 towards the scanning unit 308. The beam splitting element 304 is also arranged and configured to direct the input beam 316 reflected off the object 320 to the detection unit 306 for further processing thereof by the controller 310.

However, in accordance with other non-limiting embodiments of the present technology, the beam splitting element 304 may be configured to split the output beam 314 into at least two components of lesser intensity including a scanning beam (not separately depicted) used for scanning the surroundings 250 of the LIDAR system 300, and a reference beam (not separately depicted), which is further directed to the detection unit 306.

In other words, in these embodiments, the beam splitting element 304 can be said to be configured to divide intensity (optical power) of the output beam 314 between the scanning beam and the reference beam. In some non-limiting embodiments of the present technology, the beam splitting element 304 may be configured to divide the intensity of the output beam 314 between the scanning beam and the reference beam equally. However, in other non-limiting embodiments of the present technology, the beam splitting element 304 may be configured to divide the intensity of the output beam 314 at any predetermined splitting ratio. For example, the beam splitting element 304 may be configured to use up to 80% of the intensity of the output beam 314 for forming the scanning beam, and the remainder of up to 20% of the intensity of the output beam 314—for forming the reference beam. In yet other non-limited embodiments of the present technology, the beam splitting element 304 may be configured to vary the splitting ratio for forming the scanning beam (for example, from 1% to 95% of the intensity of the output beam 314).

It should further be noted that some portion (for example, up to 10%) of the intensity of the output beam 314 may be absorbed by a material of the beam splitting element 304, which depends on a particular configuration thereof.

Depending on the implementation of the LIDAR system 300, the beam splitting element 304 could be provided in a variety of forms, including but not limited to: a glass prism-based beam splitter component, a half-silver mirror-based beam splitter component, a dichroic mirror prism-based beam splitter component, a fiber-optic-based beam splitter component, and the like.

Thus, according to the non-limiting embodiments of the present technology, a non-exhaustive list of adjustable parameters associated with the beam splitting element 304, based on a specific application thereof, may include, for example, an operating wavelength range, which may vary from a finite number of wavelengths to a broader light spectrum (from 1200 to 1600 nm, as an example); an income incidence angle; polarizing/non-polarizing, and the like.

In a specific non-limiting example, the beam splitting element 304 can be implemented as a fiber-optic-based beam splitter component that may be of a type available from OZ Optics Ltd. of 219 Westbrook Rd Ottawa, Ontario K0A 1L0 Canada. It should be expressly understood that the beam splitting element 304 can be implemented in any other suitable equipment.

Internal Beam Paths

As is schematically depicted in FIG. 3, the LIDAR system 300 forms a plurality of internal beam paths 312 along which the output beam 314 (generated by the light source 302) and the input beam 316 (received from the surroundings 250) propagate. Specifically, light propagates along the internal beam paths 312 as follows: the light from the light source 302 passes through the beam splitting element 304, to the scanning unit 308 and, in turn, the scanning unit 308 directs the output beam 314 outward towards the surroundings 250.

Similarly, the input beam 316 follows the plurality of internal beam paths 312 to the detection unit 306. Specifically, the input beam 316 is directed by the scanning unit 308 into the LIDAR system 300 through the beam splitting element 304, toward the detection unit 306. In some implementations, the LIDAR system 300 could be arranged with beam paths that direct the input beam 316 directly from the surroundings 250 to the detection unit 306 (without the input beam 316 passing through the scanning unit 308).

It should be noted that, in various non-limiting embodiments of the present technology, the plurality of internal beam paths 312 may include a variety of optical components. For example, the LIDAR system 300 may include one or more optical components configured to condition, shape, filter, modify, steer, or direct the output beam 314 and/or the input beam 316. For example, the LIDAR system 300 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

It is contemplated that in at least some non-limiting embodiments of the present technology, the given internal beam path and the other internal beam path from the plurality of internal beam paths 312 may share at least some common optical components, however, this might not be the case in each and every embodiment of the present technology.

Scanning Unit

Generally speaking, the scanning unit 308 steers the output beam 314 in one or more directions downrange towards the surroundings 250. The scanning unit 308 is communicatively coupled to the controller 310. As such, the controller 310 is configured to control the scanning unit 308 so as to guide the output beam 314 in a desired direction downrange and/or along a predetermined scan pattern. Broadly speaking, in the context of the present specification "scan pattern" may refer to a pattern or path along which the output beam 314 is directed by the scanning unit 308 during operation.

In certain non-limiting embodiments of the present technology, the controller 310 is configured to cause the scanning unit 308 to scan the output beam 314 over a variety of horizontal angular ranges and/or vertical angular ranges; the total angular extent over which the scanning unit 308 scans the output beam 314 is sometimes referred to as the field of view (FOV). It is contemplated that the particular arrangement, orientation, and/or angular ranges could depend on the particular implementation of the LIDAR system 300. The field of view generally includes a plurality of regions of interest (ROIs), defined as portions of the FOV which may contain, for instance, objects of interest. In some implementations, the scanning unit 308 can be configured to further investigate a selected region of interest (ROI) 325. The ROI 325 of the LIDAR system 300 may refer to an area, a volume, a region, an angular range, and/or portion(s) of the surroundings 250 about which the LIDAR system 300 may be configured to scan and/or can capture data.

It should be noted that a location of the object 320 in the surroundings 250 of the vehicle 220 may be overlapped, encompassed, or enclosed at least partially within the ROI 325 of the LIDAR system 300.

According to certain non-limiting embodiments of the present technology, the scanning unit 308 may be configured to scan the output beam 314 horizontally and/or vertically, and as such, the ROI 325 of the LIDAR system 300 may have a horizontal direction and a vertical direction. For example, the ROI 325 may be defined by 45 degrees in the horizontal direction, and by 45 degrees in the vertical direction. In some implementations, different scanning axes could have different orientations.

The scanning unit 308 includes a first reflective component 350 and a second reflective component 360. The first reflective component 350 is configured to redirect the output beam 314 from the beam splitting component towards the second reflective component 350 while spreading the output beam along a first axis. The second reflective component 360 is configured to redirect the output beam 314 from the first reflective component 350 towards the surroundings 250 (through the window 380 of the housing 330) while spreading the output beam along a second axis. The second axis can be perpendicular and/or orthogonal to the first axis. As such, so-redirecting and so-spreading the output beam 314 by the combination of the first reflective component 350 and the second reflective component 360 allow to scan the surroundings 250 of the vehicle 220 along at least two perpendicular/orthogonal axes.

It can be said that the scanning unit may scan the surroundings along a pair of axes. For example, the output beam 314 may be spread by the first reflective component 350 along a first axis and by the second reflective component 360 along a second axis. In one embodiment, the first axis may be a vertical axis while the second axis may be a horizontal axis. In another embodiment, the first axis may be a horizontal axis while the second axis may be a vertical axis.

In certain non-limiting embodiments of the present technology, a given scanning unit may further include a variety of other optical components and/or mechanical-type components for performing the scanning of the output beam. For example, the given scanning unit may include one or more mirrors, prisms, lenses, MEM components, piezoelectric components, optical fibers, splitters, diffractive elements, collimating elements, and the like. It should be noted that the scanning unit may also include one or more additional actuators (not separately depicted) driving at least some of the other optical components to rotate, tilt, pivot, or move in an angular manner about one or more axes, for example.

Returning to the description of FIG. 3, the LIDAR system 300 may thus make use of the predetermined scan pattern to generate a point cloud substantially covering the ROI 325 of the LIDAR system 300. Again, this point cloud of the LIDAR system 300 may be used to render a multi-dimensional map of objects in the surroundings 250 of the vehicle 220.

Detection Unit

According to certain non-limiting embodiments of the present technology, the detection unit 306 is communicatively coupled to the controller 310 and may be implemented in a variety of ways. According to the present technology, the detection unit 306 includes a photodetector, but could include (but is not limited to) a photoreceiver, optical receiver, optical sensor, detector, optical detector, optical fibers, and the like. As mentioned above, in some non-limiting embodiments of the present technology, the detection unit 306 may be configured to acquire or detects at least a portion of the input beam 316 and produces an electrical signal that corresponds to the input beam 316. For example, if the input beam 316 includes an optical pulse, the detection unit 306 may produce an electrical current or voltage pulse that corresponds to the optical pulse detected by the detection unit 306.

It is contemplated that, in various non-limiting embodiments of the present technology, the detection unit 306 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the detection unit 306 may also include circuitry that performs signal amplification, sampling, filtering, signal conditioning, analog-to-digital conversion, time-to-digital conversion, pulse detection, threshold detection, rising-edge detection, falling-edge detection, and the like. For example, the detection unit 306 may include electronic components configured to convert a received photocurrent (e.g., a current produced by an APD in response to a received optical signal) into a voltage signal. The detection unit 306 may also include additional circuitry for producing an analog or digital output signal that corresponds to one or more characteristics (e.g., rising edge, falling edge, amplitude, duration, and the like) of a received optical pulse.

Developers of the present technology have realized that a photodetector functions when an operational voltage is applied thereto (reverse bias, for example). The value of the operational voltage may vary depending on inter alia various implementations of the present technology. Developers of the present technology have also realized that during extensive use of a LIDAR system, operational parameters of the photodetector (such as the operational voltage) may deteriorate and/or change based on inter alia moisture, temperature, movement, luminosity, etc. Consequently, it is desired to continuously calibrate and/or adjust the one or more operational parameters of the photodetector for ensuring the quality of data generated by the LIDAR system.

In the context of the present technology, during the calibration process, a voltage value determined by the photodetector in response to a particular returning light beam is compared against a baseline voltage value. More particularly, during the calibration process, the scanning unit 306 is configured to redirect a given light beam towards an inner surface of the housing 330 without exiting the housing 330. As a result, the returning light beam is reflected towards the photodetector of the detection unit 306 from the inner surface of the housing 330, as opposed to arriving from the environment.

As mentioned above, the voltage value determined in response to capturing this particular returning light beam is compared against a baseline voltage value. Broadly speaking, the baseline voltage value is indicative of a given voltage value that the photodetector determines in response to capturing this particular returning light beam if the photodetector is in a calibrated state (normal/baseline state of operation). Calibration of the photodetector is then performed based on a difference between these two voltage values.

How a given scanning unit as contemplated in some embodiments of the present technology is configured to generate this particular returning light beam for calibrating the detection unit will be discussed in greater details herein further below with reference to FIGS. 6 and 7.

Controller

Depending on the implementation, the controller 310 may include one or more processors, an application-specific integrated circuit (ASIC), a field-programmable gate array (FPGA), and/or other suitable circuitry. The controller 310 may also include non-transitory computer-readable memory to store instructions executable by the controller 310 as well as data which the controller 310 may produce based on the signals acquired from other internal components of the LIDAR system 300 and/or may provide signals to the other internal components of the LIDAR system 300. The memory can include volatile (e.g., RAM) and/or non-volatile (e.g., flash memory, a hard disk) components. The controller 310 may be configured to generate data during operation and store it in the memory. For example, this data generated by the controller 310 may be indicative of the data points in the point cloud of the LIDAR system 300.

It is contemplated that, in at least some non-limiting embodiments of the present technology, the controller 310 could be implemented in a manner similar to that of implementing the electronic device 210 and/or the computer system 100, without departing from the scope of the present technology. In addition to collecting data from the detection unit 306, the controller 310 could also be configured to provide control signals to, and potentially receive diagnostics data from, the light source 302 and the scanning unit 308.

As previously stated, the controller 310 is communicatively coupled to the light source 302, the scanning unit 308, and the detection unit 306. In some non-limiting embodiments of the present technology, the controller 310 may be configured to receive electrical trigger pulses from the light source 302, where each electrical trigger pulse corresponds to the emission of an optical pulse by the light source 302. The controller 310 may further provide instructions, a control signal, and/or a trigger signal to the light source 302 indicating when the light source 302 is to produce optical pulses indicative, for example, of the output beam 314.

Just as an example, the controller 310 may be configured to send an electrical trigger signal that includes electrical pulses, so that the light source 302 emits an optical pulse, representable by the output beam 314, in response to each electrical pulse of the electrical trigger signal. It is also contemplated that the controller 310 may cause the light source 302 to adjust one or more characteristics of output beam 314 produced by the light source 302 such as, but not limited to: frequency, period, duration, pulse energy, peak power, average power, and wavelength of the optical pulses.

By the present technology, the controller 310 is configured to determine a "time-of-flight" value for an optical pulse in order to determine the distance between the LIDAR system 300 and one or more objects in the field of view, as will be described further below. The time of flight is based on timing information associated with (i) a first moment in time when a given optical pulse (for example, of the output beam 314) was emitted by the light source 302, and (ii) a second moment in time when a portion of the given optical pulse (for example, from the input beam 316) was detected or received by the detection unit 306. In some non-limiting embodiments of the present technology, the first moment may be indicative of a moment in time when the controller 310 emits a respective electrical pulse associated with the given optical pulse; and the second moment in time may be indicative of a moment in time when the controller 310 receives, from the detection unit 306, an electrical signal generated in response to receiving the portion of the given optical pulse from the input beam 316.

In other non-limiting embodiments of the present technology, where the beam splitting element 304 is configured to split the output beam 314 into the scanning beam (not depicted) and the reference beam (not depicted), the first moment in time may be a moment in time of receiving, from the detection unit 306, a first electrical signal generated in response to receiving a portion of the reference beam. Accordingly, in these embodiments, the second moment in time may be determined as the moment in time of receiving, by the controller 310 from the detection unit 306, a second electrical signal generated in response to receiving another portion of the given optical pulse from the input beam 316.

By the present technology, the controller 310 is configured to determine, based on the first moment in time and the second moment in time, a time-of-flight value and/or a phase modulation value for the emitted pulse of the output beam 314. The time-of-flight value T, in a sense, a "round-trip" time for the emitted pulse to travel from the LIDAR system 300 to the object 320 and back to the LIDAR system 300. The controller 310 is thus broadly configured to determine the distance 318 in accordance with the following equation:

$$D = \frac{c \cdot T}{2}, \quad (1)$$

wherein D is the distance 318, T is the time-of-flight value, and c is the speed of light (approximately $3.0\times10^8$ m/s).

As previously alluded to, the LIDAR system 300 may be used to determine the distance 318 to one or more other potential objects located in the surroundings 250. By scanning the output beam 314 across the ROI 325 of the LIDAR system 300 in accordance with the predetermined scan pattern, the controller 310 is configured to map distances (similar to the distance 318) to respective data points within the ROI 325 of the LIDAR system 300. As a result, the controller 310 is generally configured to render these data points captured in succession (e.g., the point cloud) in a form of a multi-dimensional map. In some implementations, data related to the determined time of flight and/or distances to objects could be rendered in different informational formats.

As an example, this multi-dimensional map may be used by the electronic device 210 for detecting, or otherwise identifying, objects or determining a shape or distance of potential objects within the ROI 325 of the LIDAR system 300. It is contemplated that the LIDAR system 300 may be configured to repeatedly/iteratively capture and/or generate point clouds at any suitable rate for a given application.

It should be noted that such multi-dimensional maps may be recorded and stored as part of log data associated with the vehicle 220. As a result, point cloud data captured by LIDAR systems in a fleet of vehicles may be stored for later use. Furthermore, multi-dimensional maps captured by a given LIDAR system are used to localize the SDC during operation. How point cloud data captured by the LIDAR system during operation may be used for localizing the vehicle 220 will become apparent from the description herein further below.

Data Storage

Figure 4:
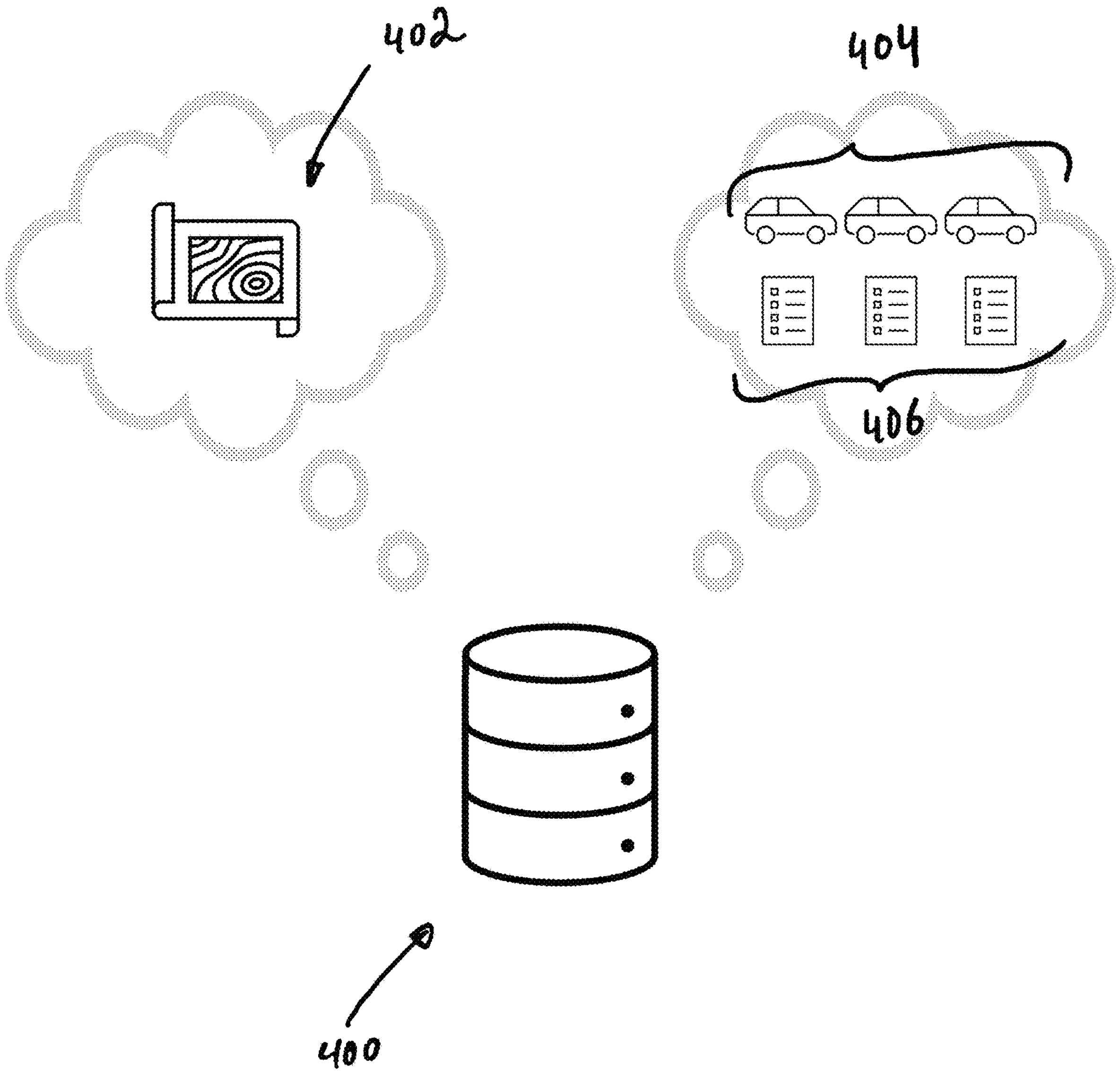
FIG. 4 depicts data stored in a storage device accessible by a server and an electronic device from the networked computing environment of FIG. 2.

With reference to FIG. 4, there is depicted a data storage device 400. The data storage device 400 may be communicatively coupled to the server 235 and the electronic device 210 of the vehicle 220. The data storage device 400 may be used by the server 235 and/or the electronic device 210 for storing data gathered during operation of the vehicle 220. The data storage device 400 may be used by the server 235 and/or the electronic device 210 for determining at least a portion of stored data to be updated. The data storage device 400 may be used by the server 235 and/or the electronic device 210 for retrieving data to be used during operation of the vehicle 220.

In some embodiments of the present technology, the data storage device 400 may receive data collected by sensors of a plurality of vehicles 404, for example, hundreds or thousands of vehicles implemented similarly to the vehicle 220. The vehicles provide sensor data captured while driving along various routes and send it to the data storage device 400. As a result, it can be said that the data storage device 400 may store log data 406 for the plurality of vehicles 404 (a fleet of vehicles).

In other embodiments of the present technology, the server 235 may use the log data 406 for creating and/or updating a map representation 402 of a geographical region where the plurality of vehicles 404 are and/or have been operating. It is contemplated that the server 235 may build the map representation 402 of the geographical region maps based on the collective information received from the plurality of vehicles 404 and stores the map representation 402 in the data storage device 400.

The server 235 may be configured to send the map representation 402 to electronic devices associated with respective vehicles in the plurality of vehicles 404. For example, if the vehicle 220 needs to drive along a route, the electronic device 210 may provide information describing the route being travelled to the server 235. In response, the server 235 provides the map representation 402 (or portions thereof) for driving along the route. It is contemplated that the map representation 402 may be pushed periodically to be stored locally by the electronic device 210 for exploitation, without departing from the scope of the present technology.

In one embodiment, the server 235 sends portions of the map representation 402 to vehicles in a compressed format so that the data transmitted consumes less bandwidth. The server 235 may receive from various vehicles, information describing the data that is locally stored by the electronic device 210. If the server 235 determines that the vehicle 220 does not have a certain portion of the map representation 402 locally stored, the server 235 may send that portion of the map representation 402. If the server 235 determines that the vehicle 220 did previously receive that particular portion of the map representation but the corresponding data was updated by the server 235 since the vehicle 220 last received the data, the server 235 may send an update for that portion of the map representation 402 to the electronic device 210.

It should be noted that the server 235 may generate the map representation 402 based on the log data 406. The server 235 updates previously computed map data by receiving more recent information from vehicles that recently travelled along routes on which map information changed. In one embodiment, map aligning techniques using Iterative Closest Point (ICP) techniques (and variants thereof) may be used by the server 235 for relating points having the closest distance in different cloud maps from the log data 406 in order to combine them and extend or grow the map representation of the geographical region in which the cloud data from the log data 406 has been captured.

Computer-Implemented Procedures

Figure 5:
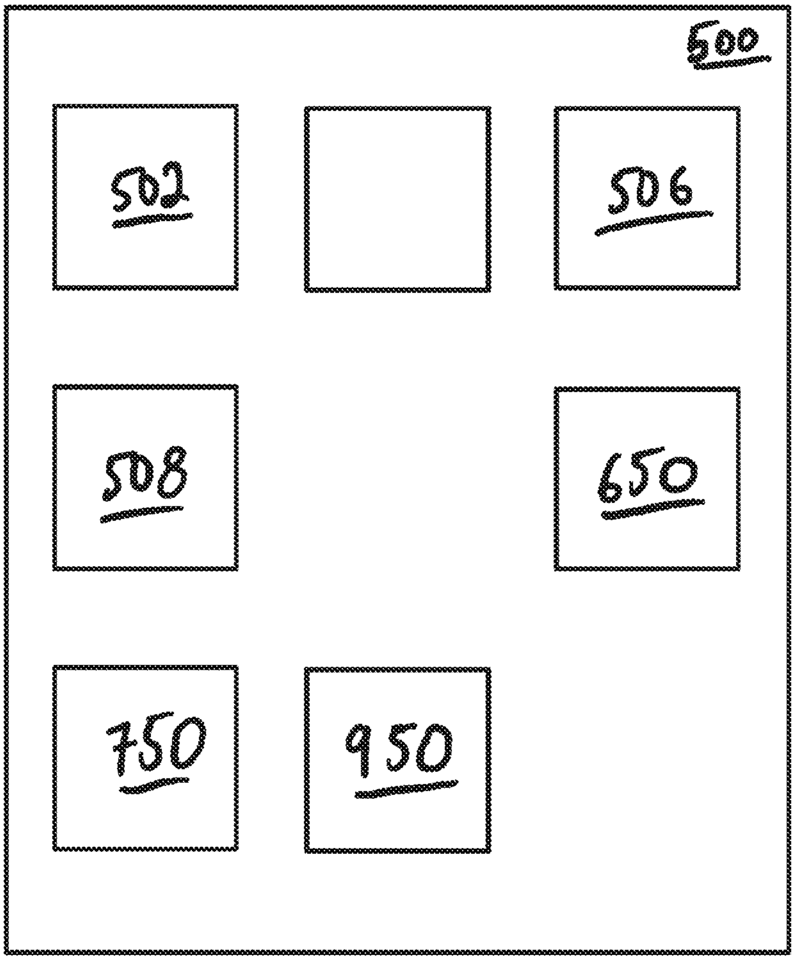
FIG. 5 depicts a plurality of computer-implemented procedures executable by the server and the electronic device.

With reference to FIG. 5, there is depicted a plurality of computer-implemented procedures 500 that may be performed by at least one of the server 235 and the electronic device 210.

The plurality of computer-implemented procedures 500 comprises a map updating algorithm 502. When a candidate portion of the map representation 402 is determined to be outdated, the server 235 may be configured to retrieve most recent point cloud data associated with the candidate portion of the map representation 402 and perform one or more map aligning techniques such as ICP techniques for relating points having the closest distance in these most recent point clouds in order to combine them and replace the candidate portion of the map representation 402. In some embodiments, once at least one of two metrics generates outputs indicative of that a portion of the map representation 402 is to be updated, the server 235 may execute the map updating algorithm 502 for retrieving the corresponding most recent point clouds and trigger the one or more map aligning techniques. In further embodiments, if the most recent point clouds are older than a pre-determined moment in time, the map updating algorithm 502 may delay the update until "fresh" point clouds are captured in that candidate portion of the map representation 402.

The plurality of computer-implemented procedures 500 comprises a sensor fusion procedure 502. Broadly speaking, sensor fusion is an approach for combining data delivered from disparate sources such that the coherent information is created. The resulting information may be more accurate than if these sources were used individually. Such data processing technique may be particularly useful when different kinds of information are combined. For example, a camera may be used for performing computer vision, and additional information about obstacles and distances may be captured by other sensors such as LIDAR and/or RADAR. One or more sensor fusion techniques may be employed for determining multi-sources information about the surroundings of the vehicle 220. In some embodiments, early sensor fusion and/or late sensor fusion may be performed. In early sensor fusion techniques 3D point clouds are combined with 2D images. In early sensor fusion, results of the detections are not combined, but instead, raw data such as the pixels and the point clouds are combined. It can be said that in early sensor fusion 3D to 2D projection is performed before the object detection. Late sensor fusion is performed after object detection and tracking.

The plurality of computer-implemented procedures 500 comprises a localization algorithm 750. As it will be described below, the localization algorithm 750 may be configured to generate a candidate location of the vehicle 220 based on the map representation 402, a given point cloud captured by the vehicle 220, and an initial approximation of the current location of the vehicle 220. In one embodiment, the localization algorithm 750 may perform an ICP type process onto point cloud data and the map representation 402. Broadly speaking, as part of an ICP type process, one point cloud (vertex cloud), the reference, or target, is kept fixed, while the other one, the source, is transformed to best match the reference. The algorithm iteratively revises the transformation (combination of translation and rotation) needed to minimize an error metric, usually a distance from the source to the reference point cloud, such as the sum of squared differences between the coordinates of the matched pairs. ICP is one of the widely used algorithms in aligning three dimensional models given an "initial guess" of the rigid transformation required.

The plurality of computer-implemented procedures 500 comprises other localization algorithms 506. In some embodiments, a localization source may determine a candidate location of a vehicle based on odometry that represents the process of estimating the motion of the vehicle relative to the vehicle's position based on sequential sensor data received by the vehicle. A localization algorithm may use odometry to assist in initializing position of the vehicle for use by a localization technique in performing its local search. The localization algorithm may also use odometry to estimate velocity and acceleration of the vehicle as a way to extrapolate the vehicle position in between sensor readings that may be used to localize.

In further embodiments, a localization source may include image-based odometry to determine location of the vehicle. Variations of image-based odometry determine location of the vehicle by comparing different features extracted from camera images (for example, ground textures, image features, edges, and so on) with a map.

In other embodiments, one or more lidar based localization techniques may be used are represent respective localization sources. It is contemplated that a feature-based localization source may be employed where features are detected using sensor data such as camera images and LIDAR scans and compares the features with features in one or more map representations of the region to determine the location of the vehicle.

In at least some embodiments of the present technology, in at least some embodiments of the present technology, a localization source may use LIDAR-based odometry techniques to determine location of the vehicle. Variations of LIDAR-based odometry use one of pairwise iterative closest point (ICP) or multi-scan ICP. Variants of all the above techniques are obtained by changing various parameters such as iteration limits, search radius, weighting, and so on.

The localization sources non-exhaustively described above may further include other localization sources which use global navigation satellite system (GNSS) based localization and inertial measurement unit (IMU) based odometry. Variants of these techniques use different integration methods and various correction methods.

The plurality of computer-implemented procedures 500 comprises a simulation algorithm 650. As it will be described in greater details herein below, the simulation algorithm 650 may be configured to generate simulated point clouds based on point clouds retrieved from the log data 406. The purpose of the simulation algorithm 650 is to generate a degraded version of an input point cloud. The degradation caused by the simulation algorithm 650 may be representative of the effect of various conditions in which a given vehicle may operate. In one example, the degradation may be representative of an effect of a traffic condition, such as presence of large nearby vehicles obstructing the LIDAR sensor. In another example, the degradation may be representative of an effect of an environmental condition, such as rain, dirt, and/or snow occluding the LIDAR sensor.

The plurality of computer-implemented procedures 500 comprises a first metric 508 and a second metric 950. Broadly speaking, the server 235 and/or the electronic device 210 may employ at least one of the first metric 508 and the second metric 950 for determining whether a given portion of the map representation is not up to date. In addition, or alternatively, the server 235 and/or the electronic device 210 may employ at least one of the first metric 508 and the second metric 950 for determining if outputs of the localization algorithm 750 are in a sense "trustworthy" in a given portion of the map representation 402. As it will be discussed in greater details herein further below, the server 235 may train a Machine Learning Algorithm (MLA) based on outcomes generated by the first metric 508 and use this trained MLA as the second metric 950.

Broadly speaking, a given MLA is first "built" (or trained) using training data and training targets. During a given training iteration, the MLA is inputted with a training input, and generates a respective prediction. The server 106 is then configured to, in a sense, "adjust" the MLA based on a comparison of the prediction against a respective training target for the training input. For example, the adjustment may be performed by the server 106 employing one or more machine learning techniques such as, but not limited to, a back-propagation technique. After a large number of training iterations, the MLA is thus "adjusted" in a manner that allows making predictions based on inputted data such that those predictions are close to the respective training targets. In some embodiments, the trained MLA may be representative of a metric to be used for determining a portion of the map representation 402 to be updated. In some embodiments, the trained MLA may be representative of a metric to be used for determining whether current outputs from the localization algorithm 750 are trustworthy to be used during operation of the vehicle 220.

How the server 235 may be configured to employ the first metric 508 for determining a portion of the map representation 402 to be updated will now be described in greater detail.

Past Trajectories & Degradation

Figure 6:
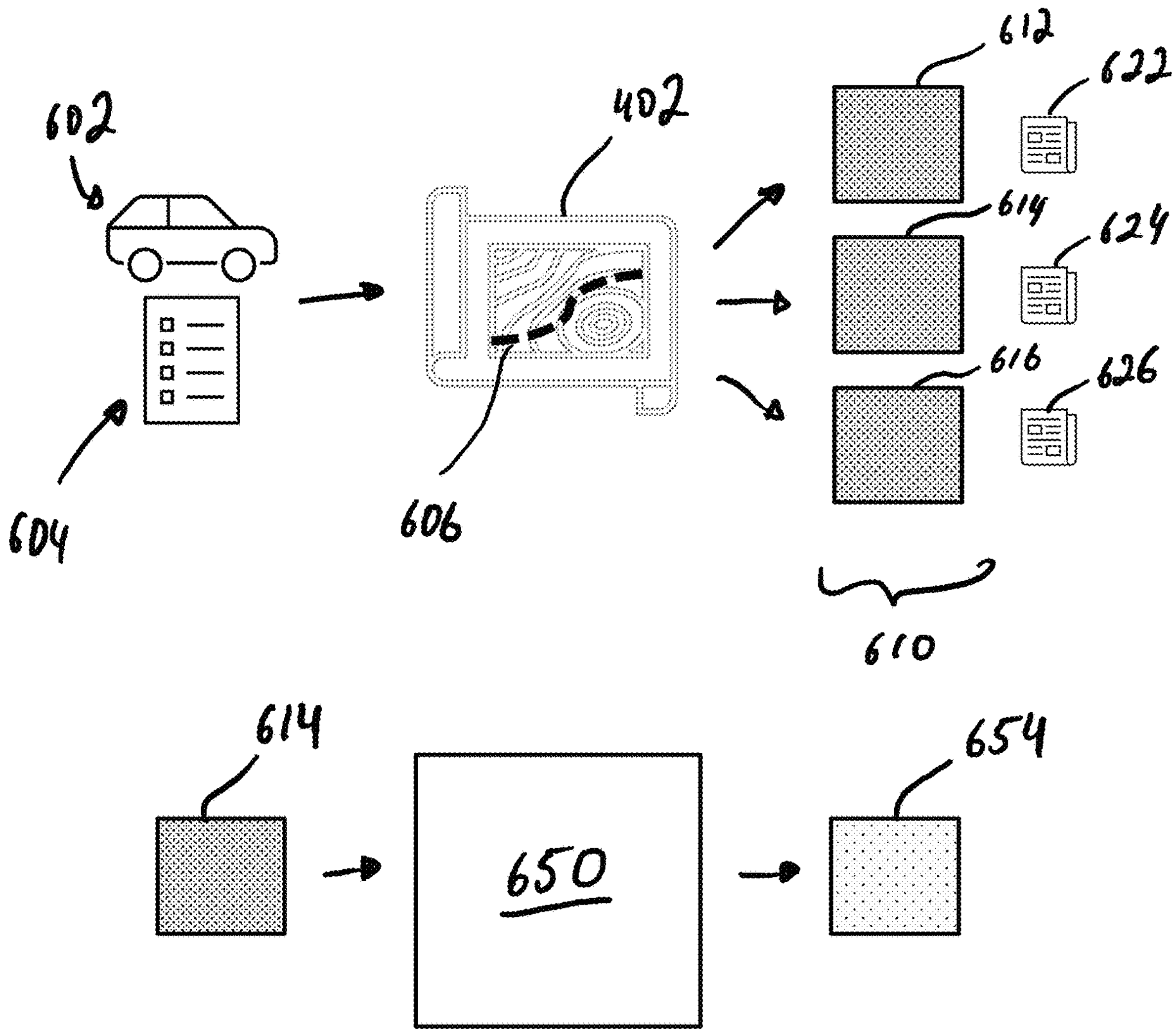
FIG. 6 depicts determination of a plurality of point clouds associated with a past trajectory of a vehicle of the networked computing environment of FIG. 2 and generation of a simulated point cloud in accordance with certain non-limiting embodiments of the present technology.

With reference to FIG. 6, the server 235 is configured to use log data 604 of the vehicle 602 (given SDC in a fleet) in order to generate, as part of a simulation process, a trajectory 606 of the SDC 602 in the map representation 402. It should be noted that the vehicle 602 has been operating in the geographical region covered by the map representation 402. As such, the server 235 may be configured to determine a past trajectory of the vehicle 602 and use it as the trajectory 606. Hence, the trajectory 606 can be referred to as the past trajectory 606. The server 235 may be configured to retrieve from the log data 604 a plurality of point clouds 610 representative of point clouds captured by the LIDAR system of the vehicle 602 during the past trajectory 606.

It should be noted that respective point clouds from the plurality of point clouds 610 are associated with additional data in the log data 604. For example, a point cloud 612 is associated with additional data 622, a point cloud 614 is associated with additional data 624, and a point cloud 616 is associated with additional data 626. Additional data may include timestamps representative of moments in time when a corresponding point cloud has been captured, GPS data representative of an approximate location of the vehicle 602 when the corresponding point cloud has been captured, kinematic/odometry data (speed, velocity, acceleration, etc.) of the vehicle 602 when the corresponding point cloud has been captured, and the like.

The server 235 may be configured to select one or more (such as a sequence) of point clouds from the plurality of point clouds 610 and generate a respective one or more simulated point clouds based thereon. For example, the server 235 may be configured to generate a simulated point cloud 654 based on a given point cloud associated with the past trajectory 606. To that end, the server 235 may be configured to perform the simulation procedure 650 onto the point cloud 614 for generating the simulated point cloud 654.

It should be noted that the simulated point cloud 654 can be a degraded version of the point cloud 614. In some embodiments, the procedure 650 may be used to remove at least a set of points from the point cloud 614. The removal of the set of points can simulate a traffic condition where a large object is obstructing the LIDAR system from capturing a portion of the surroundings.

In other embodiments, instead of simulating an effect of a traffic condition on the point cloud 614, the simulation procedure 650 may be used for simulating an effect of one or more environmental conditions such as at least one of rain, snow, and dirt occluding the LIDAR system. As such, in some embodiments, when executing the procedure 650, the server 235 may be configured to apply a filter onto the point cloud 614 and which adds noise to the point cloud 614. For example, a noise function can be determined based on log data representative of point clouds captured in specific traffic and/or environmental conditions.

Localization Algorithm

Figure 7:
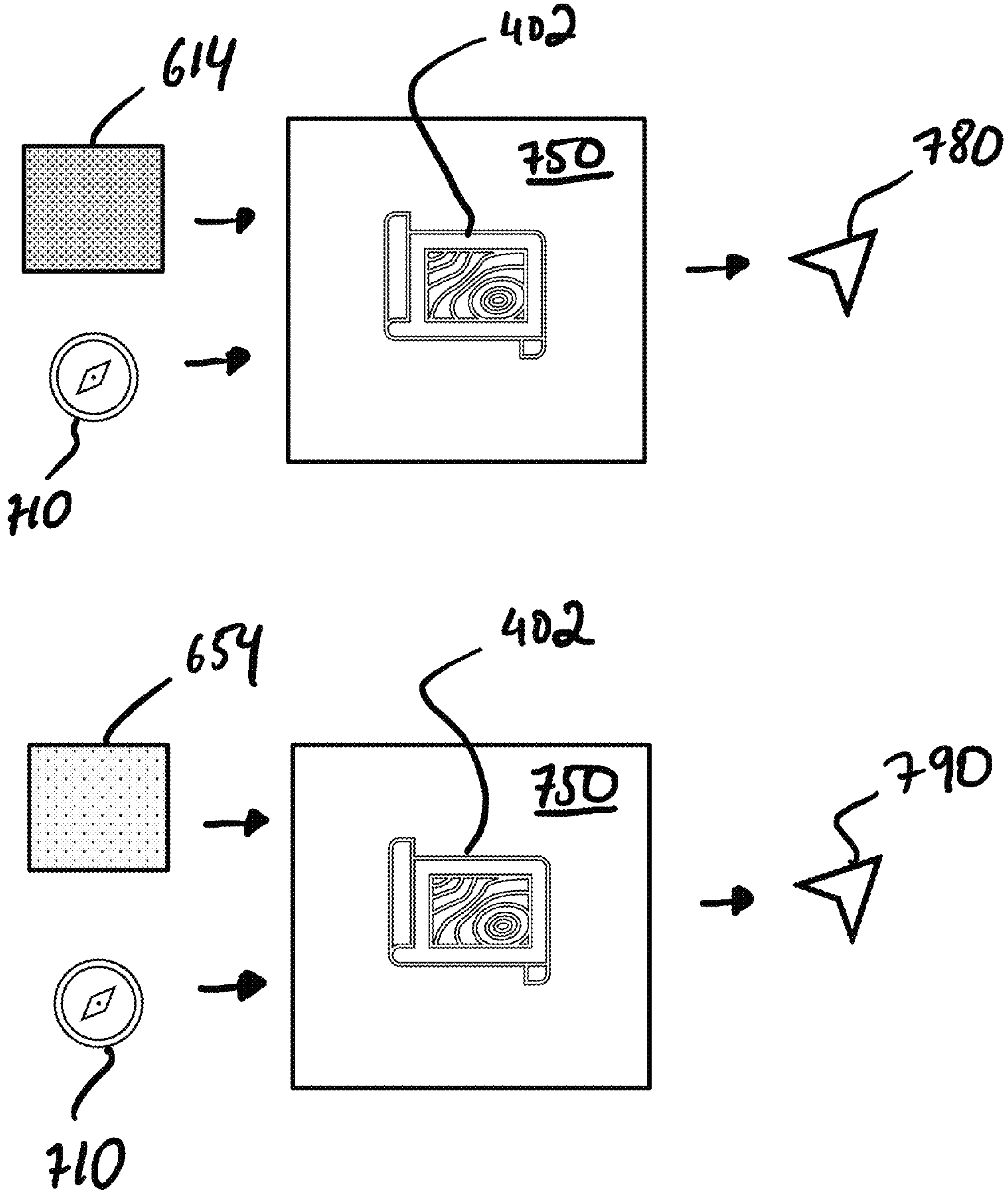
FIG. 7 depicts a localization algorithm used to generate candidate locations of the vehicle.

With reference to FIG. 7, there is depicted two instances of the server 235 employing the localization algorithm 750. During a first instance, the server 235 is configured to provide the point cloud 614 and an initial approximation 710 of the location of the vehicle 220 at the timestamp associated with the point cloud 614 to the localization algorithm 750. It should be noted that the localization algorithm 750 also has access to the map representation 402. As a result, the localization algorithm 750 is configured to generate a candidate location 780. It should be noted that the candidate location 780 is associated with a given timestamp of the point cloud 614, and a candidate portion of the map representation 402 representing the then current surroundings of the vehicle 220 when the point cloud 614 has been captured. It is contemplated that a given candidate location generated by the localization algorithm 750 may comprise a candidate position of the vehicle 220, and a candidate orientation of vehicle 220.

In some embodiments, the localization algorithm 750 may initiate the determination of the candidate location 780 by initially positioning the point cloud 614 with respect to the map representation 402 based on the initial approximation 710, and may iteratively move the point cloud 614 and hence iteratively adjust the location to be outputted by the localization algorithm 750.

During a second instance, the server 235 is configured to provide the simulated point cloud 654 and the initial approximation 710 to the localization algorithm 750. As a result, the localization algorithm 750 is configured to generate a candidate location 790. It should be noted that the candidate location 790 is associated with a given timestamp of the point cloud 614, and a candidate portion of the map representation 402 representing the then current surroundings of the vehicle 220 when the point cloud 614 has been captured.

In some embodiments, the server 235 may be configured to use in addition to, or instead of the simulated point cloud, another point cloud from log data of another SDC in the fleet. For example, the server 235 may be configured to retrieve one or more point clouds associated with a given location where the point cloud 614 has been captured by the LIDAR system. As such, the server 235 may use another point cloud captured by another LIDAR system of another SDC in the fleet.

In some embodiments of the present technology, the server 235 may be configured to generate a plurality of candidate locations associated with the timestamp of the point cloud 614 along the past trajectory 606. One of these candidate locations may be based in part on the point cloud 614, another one may be based in part on the simulated point cloud 654, an additional one may be based in part on another simulated point cloud (to represent an effect of a different condition than the simulated point cloud 654), and a further one may be based in part on a point cloud captured by a different LIDAR system of an other vehicle when located at the given location.

In further embodiments, a respective plurality of candidate locations may be generated similarly for a series of timestamps along the past trajectory 606. For example, a first plurality of candidate locations may be generated for a first timestamp, a second plurality of candidate locations may be generated for a second timestamp, a third plurality of candidate locations may be generated for a third timestamp, and so forth.

The server 235 may be configured to apply the first metric 508 on a given plurality of candidate locations associated with a given timestamp and a given location in the map representation 402. In the context of the present technology, the first metric 508 may generate a convergence parameter based on a given plurality of candidate locations and associate this parameter with the given location in the map representation.

As it will be described in details herein below, depending on the convergence parameter, the server 235 may determine that a candidate portion of the map representation 402 containing the given location may require updating. It is also contemplated that the server 235 may determine convergence parameters for a sequence of timestamps (e.g., a sequence of given locations in a candidate portion of the map representation). Convergence parameters for the sequence of timestamps in the past trajectory 606 may be used together for determining that candidate portion of the map representation 402 containing the sequence of given location may require updating.

Convergence Metric

Figure 8:
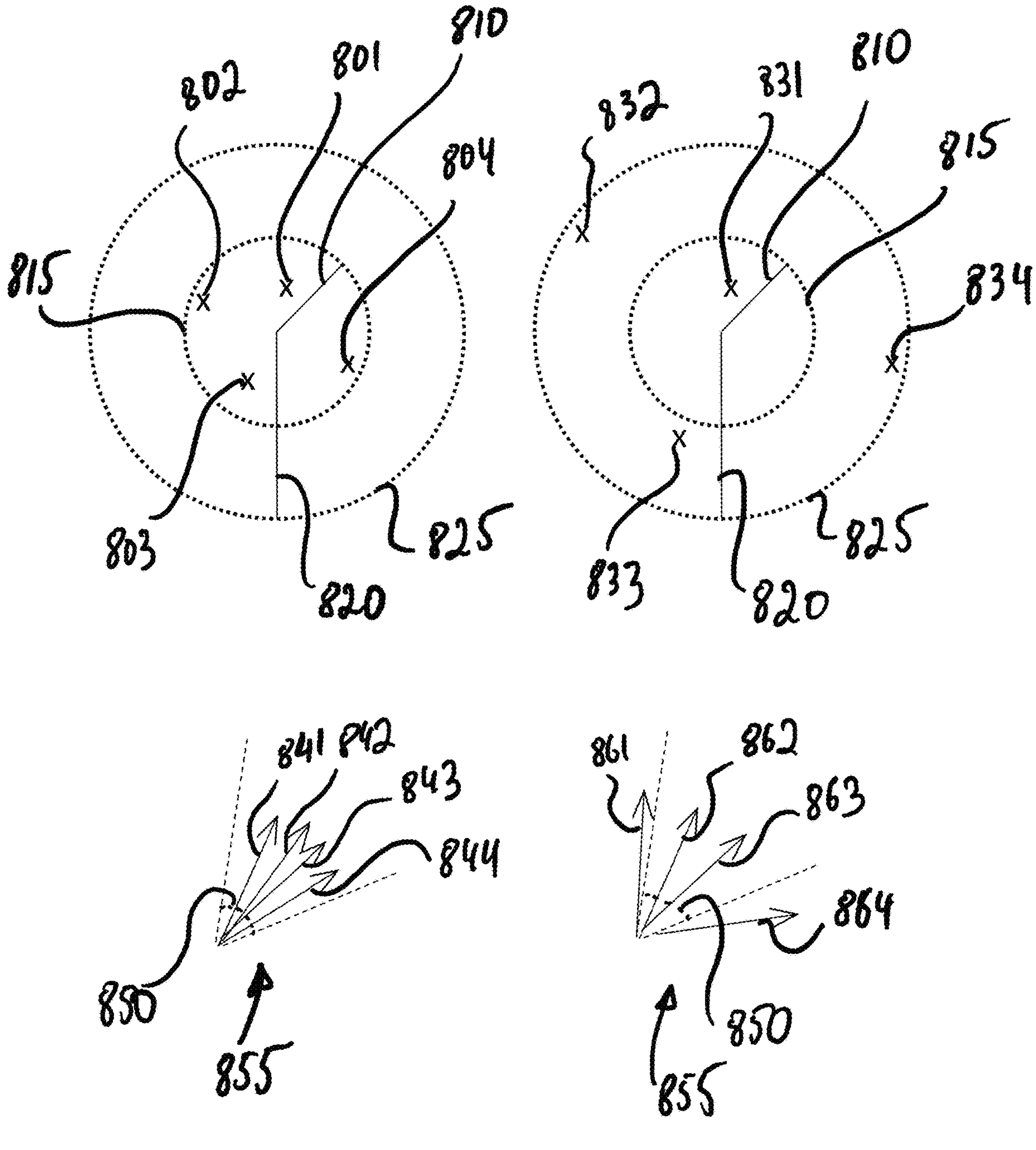
FIG. 8 depicts a first metric applied onto candidate locations generated by the localization algorithm.

With reference to FIG. 8, there are two depicted examples of how the first metric 508 may be used for determining a convergence parameter for a plurality of candidate locations.

In a first example, let it be assumed that the plurality of candidate locations includes four candidate locations, a first one including a first candidate position 801 and a first candidate orientation 841, a second one including a second candidate position 802 and a second candidate orientation 842, a third one including a third candidate position 803 and a third candidate orientation 843, and a fourth one including a fourth candidate position 804 and a fourth candidate orientation 844.

The server 235 may apply the first metric 508 to determine a size of a smallest circle in which the candidate positions 801, 802, 803, and 804 are encompassed. The server 235 may also compare a radius of this smallest circle against a pre-determined radius 810. It can also be said that the server 235 applying the first metric 508 may determine whether the candidate positions 801, 802, 803, and 804 can be encompassed within a circle 815 having the pre-determined radius 810.

It can be said that the circle 815 is a given circle centered at a given position and having the pre-determined radius. In some embodiments, the given position may be a true position associated with the vehicle along the past trajectory at that timestamp. In other embodiments, the given position may not be the true position. It can be said that the purpose of applying the first metric 508 may be to determine whether candidate positions generated by the localization algorithm 750 "converge" within the pre-determined radius 810. It can be said that it is less relevant whether the localization algorithm 750 generates candidate positions that are close to a true position, than whether the localization algorithm generates consistent candidate positions when employing simulated/degraded point clouds.

The server 235 may apply the first metric 508 to determine a size of a smallest sector in which the candidate orientations 841, 842, 843, and 844 are encompassed. The server 235 may also compare an angle of this smallest sector against a pre-determined angle 850. It can also be said that the server 235 applying the first metric 508 may determine whether the candidate orientations 841, 842, 843, and 844 can be encompassed within a sector 855 having the pre-determined angle 850.

It can be said that the purpose of applying the first metric 508 may be to determine whether candidate orientations generated by the localization algorithm 750 "converge" within the pre-determined angle 850. It can be said that it is less relevant whether the localization algorithm 750 generates candidate orientations that are close to a true orientation, than whether the localization algorithm 750 generates consistent candidate orientations when employing simulated/degraded point clouds.

In this first example, it can be said that the convergence parameter determined by the first metric 508 is indicative of that the localization algorithm 750 in the candidate portion of the map representation generates convergent candidates.

In a second example, let it be assumed that the plurality of candidate locations includes four candidate locations, a first one including a fifth candidate position 831 and a fifth candidate orientation 861, a sixth one including a sixth candidate position 832 and a sixth candidate orientation 862, a seventh one including a seventh candidate position 833 and a seventh candidate orientation 863, and an eighth one including an eighth candidate position 834 and an eighth candidate orientation 864.

The server 235 may apply the first metric 508 to determine a size of a smallest circle in which the candidate positions 831, 832, 833, and 834 are encompassed. The server 235 may also compare a radius of this smallest circle against the pre-determined radius 810. It can also be said that the server 235 applying the first metric 508 may determine whether the candidate positions 831, 832, 833, and 834 can be encompassed within the circle 815 having the pre-determined radius 810.

It can be said that the purpose of applying the first metric 508 may be to determine whether candidate positions generated by the localization algorithm 750 "converge" within the pre-determined radius 810. In this second example, it can be seen that the candidate positions 831, 832, 833, and 834 do not converge within a pre-determined radius 810, but they do converge within a pre-determined radius 820—that is, are encompassed within a (larger) circle 825.

The server 235 may apply the first metric 508 to determine a size of a smallest sector in which the candidate orientations 861, 862, 863, and 864 are encompassed. The server 235 may also compare an angle of this smallest sector against the pre-determined angle 850. It can also be said that the server 235 applying the first metric 508 may determine whether the candidate orientations 861, 862, 863, and 864 can be encompassed within the sector 855 having the pre-determined angle 850.

It can be said that the purpose of applying the first metric 508 may be to determine whether candidate orientations generated by the localization algorithm 750 "converge" within the pre-determined angle 850. In this second example, it can be seen that the candidate orientations 861, 862, 863, and 864 do not converge within the pre-determined angle 850.

In this second example, it can be said that the convergence parameter determined by the first metric 508 is indicative of that the localization algorithm 750 in the candidate portion of the map representation generates divergent candidates, and/or not convergent within one or more pre-determined values (one or more radii and/or one or more sectors).

In some embodiments of the present technology, based on the parameter generated by the first metric 508, the server 235 may determine whether the candidate portion of the map representation 402 is to be updated. In other words, it can be said that if the candidate locations generated for a timestamp in a candidate portion of the map representation 402 do not converge within a pre-determined value, the performance of the localization algorithm 750 is impacted by an outdated portion of the map representation 402. Hence, the outcome of the first metric 508 may be a signal as to whether or not the corresponding candidate portion of the map representation 402 requires an update.

The server 235 may be configured to update a candidate portion of the map representation. As explained above, the server 235 may be configured to retrieve most recent point cloud data associated with the candidate portion of the map representation 402 and perform one or more map aligning techniques such as ICP techniques for relating points having the closest distance in these most recent point clouds in order to combine them and replace the candidate portion of the map representation 402. In further embodiments, if the most recent point clouds are older than a pre-determined moment in time, the map updating algorithm 502 may delay the update until "fresh" point clouds are captured in that candidate portion of the map representation 402.

Second Metric

Figure 9:
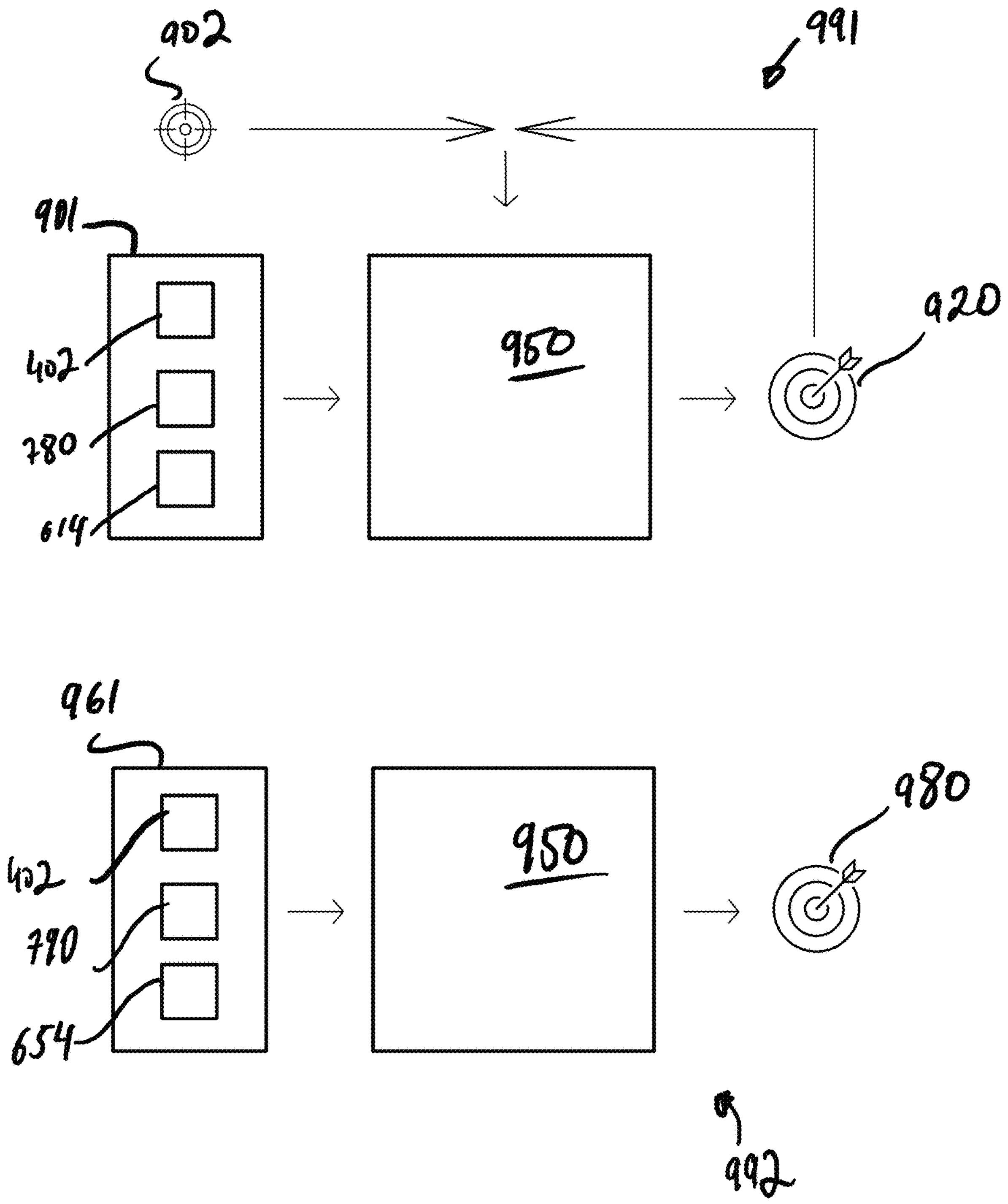
FIG. 9 depicts a training iteration and an in-use iteration of a second metric, in accordance with certain non-limiting embodiments of the present technology.

As mentioned above, the server 235 may be configured to train the second metric 950 based on outcomes of the first metric 508. With reference to FIG. 9, there is depicted a training iteration 991 of an MLA, and an in-use iteration 992 of the MLA. Once the MLA is trained, the MLA can be used as the second metric 950. As it will become apparent from the description herein further below, the in-use iteration 992 of the MLA may be performed "offline" by the server 235 when determining which candidate portions of the map representation 402 are to be updated, and in the same or other embodiments, may be performed "online" by the electronic device 210 during operation of the vehicle 220 for determining whether the localization algorithm 750 is a valid localization source in the current portion of the map representation 402.

During training, the server 235 is configured to generate a training set including a training input 901 and a training label 902. The training input 901 includes a map representation 402 (or at least the candidate portion thereof), the candidate location 780, and the point cloud 614. The server 235 is configured to generate the training label 902 based on the parameter outputted by the first metric 508.

For example, the training label 902 may be either "0" indicative of that candidate locations for the given timestamp do not converge within the pre-determined radius 810, or "1" indicative of that candidate locations for the given timestamp do converge within the pre-determined radius 810. It can be said that in some implementations, the training label 902 may be indicative of whether the training input is a positive example for the MLA 950, or otherwise a negative example for the MLA 950. However, it should be noted that the format of the training label 902 may be other than binary. The training label 902 may be indicative of a ground-truth class amongst more than two classes. For example, different classes may be associated with respective pre-determined radii of convergence. In this example, the server 235 may assign a ground truth class amongst a plurality of classes to the training input 901 that correspond to radii of convergence of the candidate locations in this training example. In further embodiments, the training label 902 may take the form of a value on a continuous spectrum of values (e.g., regression), without departing from the scope of the present technology. It is contemplated that the output of the first metric 508 can be used for generating a training label for training the second metric 950.

The server 235 uses the training set for training the MLA 950 to generate a prediction parameter 920 indicative of whether the localization algorithm 750 generates divergent candidate locations for the SDC 602 in the candidate portion of the map representation 402.

For example, the prediction parameter 920 is indicative of that candidate locations are divergent if the localization algorithm generates candidate locations that do not converge within a pre-determined threshold value.

In further embodiments, a given training set may include in the training input a simulated point cloud instead of the point cloud 614, and a corresponding candidate location generated based on the simulated point cloud instead of the candidate location 780.

It is contemplated that at least one of the first metric 508 and the second metric 950 may be used by the server 235 in an "offline" mode for determining and updating portions of the map representation 402 that are to be updated. It is contemplated that at least one of the first metric 508 and the second metric 950 may be used by the server 235 in an "online" mode for determining whether outputs of the localization algorithm 750 are to be used for controlling operation of the vehicle 220 in a portion of the map representation where the vehicle 220 is currently located.

In some embodiments, the server 235 may use the first metric 508 similarly to what has been described above with reference to FIG. 8 for determining a parameter for candidate locations generated for a candidate portion of the map representation 402. Additionally or alternatively, the second metric 950 (once trained) may also be used to determine a second parameter for candidate location for a candidate portion of the map representation 402. The server 235 may use a combination of parameters from the first metric 508 and the second metric 950 for determining whether the candidate portion of the map representation 402 is to be updated.

In other embodiments, the electronic device 210 may use the first metric 508 similarly to what has been described above with reference to FIG. 8 for determining a parameter for candidate locations generated for a current portion of the map representation 402 during operation of the vehicle 220. Additionally or alternatively, the second metric 950 (once trained) may also be used to determine a second parameter for a candidate location for a current portion of the map representation 402. The electronic device 210 may use a combination of parameters from the first metric 580 and the second metric 950 for determining whether the current candidate location generated by the localization algorithm 750 is to be used for controlling operation of the vehicle 220 in the current portion of the map representation 402.

Figure 10:
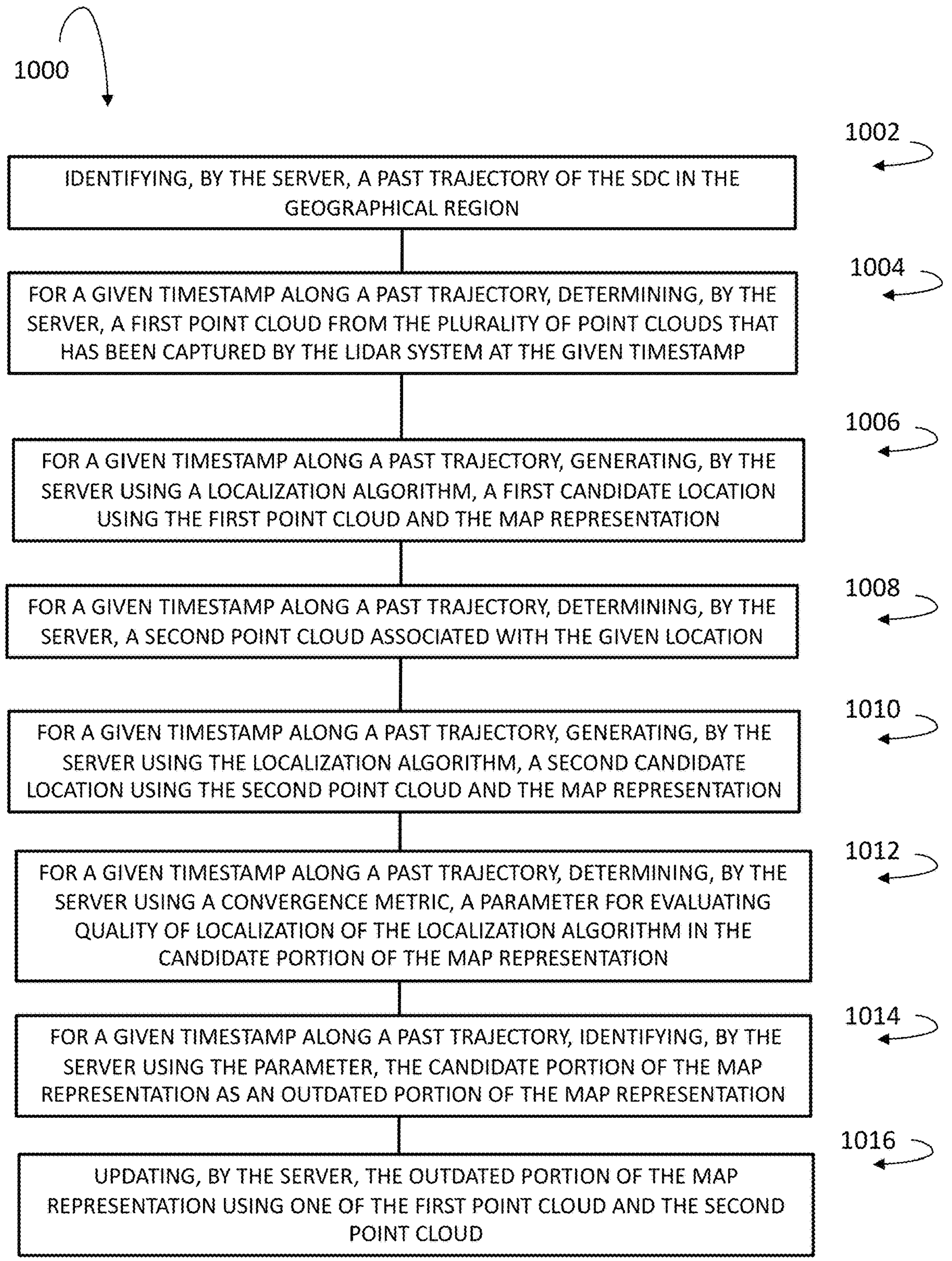
FIG. 10 is a schematic flowchart of a method executable in accordance with certain non-limiting embodiments of the present technology.

With reference to FIG. 10, there is depicted a flowchart of a method 1000 executable by the server 235 for updating a portion of the map representation 402. Various steps of the method 100 will now be described in greater detail.

STEP 1002: Identifying, by the Server, a Past Trajectory of the SDC in the Geographical Region The method 1000 begins at step 1002 with the server 235 configured to identify the past trajectory 606 of the vehicle 220 in the geographical region. The past trajectory 606 is associated with a plurality of point clouds 610 from log data of the vehicle 220. The plurality of point clouds has been captured by the LIDAR system when the vehicle 220 was travelling along the past trajectory 606 in the geographical region.

It is contemplated that the server 235 may be configured to perform the method 1000 for a plurality of past trajectories in the geographical region. In such a manner, different routes taken by vehicles in the geographical region can be submitted for verification/update.

STEP 1004: for a Given Timestamp along a Past Trajectory, Determining, by the Server, a First Point Cloud from the Plurality of Point Clouds that has been Captured by the LIDAR System at the Given Timestamp The method 1000 continues to step 1004 with the server 235 configured to, for a given timestamp along the past trajectory of the vehicle 220 when the vehicle 220 has been located at a given location in the geographical region, determine the point cloud 614 from the plurality of point clouds 610 that has been captured by the LIDAR system at the given timestamp.

STEP 1006: for a Given Timestamp along a Past Trajectory, Generating, by the Server using a Localization Algorithm, a First Candidate Location using the First Point Cloud and the Map Representation The method 1000 continues to step 1006 with the server 235 configured to, for a given timestamp along the past trajectory of the vehicle 220 when the vehicle 220 has been located at a given location in the geographical region, generate using localization algorithm 750 a first candidate location 780 using the point cloud 614 and the map representation 402. The given location is in the candidate portion of the map representation 402.

STEP 1008: for a Given Timestamp along a Past Trajectory, Determining, by the Server, a Second Point Cloud Associated with the Given Location The method 1000 continues to step 1008 with the server 235 configured to, for a given timestamp along the past trajectory of the vehicle 220 when the vehicle 220 has been located at a given location in the geographical region, determine a second point cloud associated with the given location.

In some embodiments, the second point cloud may be the simulated point cloud 654 being a degraded version of the first point cloud. For example, the degraded version of the point cloud 614 is missing a subset of points from the point cloud 614. In other embodiments, the server 235 may apply a filter representing an effect of an environmental condition on the point cloud 614. For example, the environmental condition may be at least one of rain, snow, and dirt occluding the LIDAR system. In further embodiments, the server 235 may determine the second point cloud from log data of a second vehicle that has operated in the geographical region, without departing from the scope of the present technology.

STEP 1010: for a Given Timestamp along a Past Trajectory, Generating, by the Server using the Localization Algorithm, a Second Candidate Location using the Second Point Cloud and the Map Representation The method 1000 continues to step 1010 with the server 235 configured to, for a given timestamp along the past trajectory of the vehicle 220 when the SDC has been located at a given location in the geographical region, generate using the localization algorithm 750 the second candidate location 790 using the second point cloud and the map representation 402.

STEP 1012: for a Given Timestamp along a Past Trajectory, Determining, by the Server using a Convergence Metric, a Parameter for Evaluating Quality of Localization of the Localization Algorithm in the Candidate Portion of the Map Representation The method 1000 continues to step 1012 with the server 235 configured to, for a given timestamp along the past trajectory of the vehicle 220 when the SDC has been located at a given location in the geographical region, determine using the first metric 508 a parameter for evaluating quality of localization of the localization algorithm 750 in the candidate portion of the map representation 402. The parameter is indicative of convergence of the first candidate location 780 with the second candidate location 790.

STEP 1014: for a Given Timestamp along a Past Trajectory, Identifying, by the Server using the Parameter, the Candidate Portion of the Map Representation as an Outdated Portion of the Map Representation The method 1000 continues to step 1014 with the server 235 configured to, for a given timestamp along the past trajectory of the vehicle 220 when the SDC has been located at a given location in the geographical region, identify using the parameter the candidate portion of the map representation 402 as an outdated portion of the map representation 402. For example, if the parameter is indicative that the first and the second candidate locations do not converge within a pre-determined value, the server 235 may identify the candidate portion as an outdated portion.

STEP 1016: Updating, by the Server, the Outdated Portion of the Map Representation using One of the First Point Cloud and the Second Point Cloud The method 100 continues to step 1016 with the server 235 configured to update the outdated portion of the map representation 402 using one of the first point cloud and the second point cloud. In some embodiments, the server 235 may use an ICP algorithm for replacing the outdated portion with point cloud data from the first point cloud and/or the second point cloud.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of controlling operation of a Self-Driving Car (SDC), the SDC being communicatively coupled to a Light Detection and Ranging (LIDAR) system and an electronic device configured to acquire data from a plurality of localization sources for locating the SDC on a map representation of a geographical region, the method comprising:

at a given timestamp during operation of the SDC when the SDC is located at a current location in the geographical region:

generating, using a localization algorithm, a candidate location of the SDC using a point cloud captured by the LIDAR system, the map representation, and an initial approximation of the current location of the SDC on the map representation;

generating, using a Machine Learning Algorithm (MLA), a parameter indicative of whether the localization algorithm is likely to generate divergent candidate locations for the SDC in a candidate portion of the map representation under a variety of conditions, the candidate portion including the current location, wherein an input to the MLA comprises the point cloud, the candidate portion of the map representation, and the candidate location, and wherein an output of the MLA is the parameter;

determining, using the parameter, that the localization algorithm is an unreliable localization source in the candidate portion of the map representation;

determining a multi-sourced location of the SDC using data acquired from a reduced set of localization sources, the reduced set of localization sources excluding the localization algorithm; and controlling operation of the SDC using the multi-sourced location as the current location of the SDC.

2. The method of claim 1, wherein the candidate location is a candidate position of the SDC.

3. The method of claim 1, wherein the candidate location is a candidate position and a candidate orientation of the SDC.

4. The method of claim 1, wherein the variety of conditions include at least one of rain, snow, and dirt occluding the LIDAR system.

5. The method of claim 1, wherein the map representation is a High Definition (HD) map.

6. The method of claim 1, wherein the plurality of localization sources comprise an odometry based localization source, a LIDAR based localization source, an image-based localization source, and a Global Navigation Satellite System (GNSS) source.

7. An electronic device for controlling operation of a Self-Driving Car (SDC), the SDC being communicatively coupled to a Light Detection and Ranging (LIDAR) system and the electronic device configured to acquire data from a plurality of localization sources for locating the SDC on a map representation of a geographical region, the electronic device being configured to:

at a given timestamp during operation of the SDC when the SDC is located at a current location in the geographical region:

generate, using a localization algorithm, a candidate location of the SDC using a point cloud captured by the LIDAR system, the map representation, and an initial approximation of the current location of the SDC on the map representation;

generate, using a Machine Learning Algorithm (MLA), a parameter indicative of whether the localization algorithm is likely to generate divergent candidate locations for the SDC in a candidate portion of the map representation under a variety of conditions, the candidate portion including the current location, wherein an input to the MLA comprises the point cloud, the candidate portion of the map representation, and the candidate location, and wherein an output of the MLA is the parameter;

determine, using the parameter, that the localization algorithm is an unreliable localization source in the candidate portion of the map representation;

determine a multi-sourced location of the SDC using data acquired from a reduced set of localization sources, the reduced set of localization sources excluding the localization algorithm; and control operation of the SDC using the multi-sourced location as the current location of the SDC.

8. The electronic device of claim 7, wherein the candidate location is a candidate position of the SDC.

9. The electronic device of claim 7, wherein the candidate location is a candidate position and a candidate orientation of the SDC.

10. The electronic device of claim 7, wherein the variety of conditions include at least one of rain, snow, and dirt occluding the LIDAR system.

11. The electronic device of claim 7, wherein the map representation is a High Definition (HD) map.

12. The electronic device of claim 7, wherein the plurality of localization sources comprises an odometry based localization source, a LIDAR based localization source, an image-based localization source, and a Global Navigation Satellite System (GNSS) source.

* * * * *